(12) United States Patent
Shimoda et al.

(10) Patent No.: US 8,786,885 B2
(45) Date of Patent: Jul. 22, 2014

(54) IMAGE FORMING APPARATUS WITH IMAGE DATA MAPPER

(75) Inventors: Tomohiko Shimoda, Ibaraki-ken (JP); Eiji Hori, Ibaraki-ken (JP); Akira Nishiyama, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 42 days.

(21) Appl. No.: 13/361,211

(22) Filed: Jan. 30, 2012

(65) Prior Publication Data

US 2012/0229822 A1    Sep. 13, 2012

(30) Foreign Application Priority Data

Mar. 9, 2011 (JP) ................................ P2011-051857

(51) Int. Cl.
*G06F 3/12* (2006.01)

(52) U.S. Cl.
USPC ........................................... 358/1.15; 358/1.1

(58) Field of Classification Search
USPC ........................................ 358/1.15, 1.18, 1.1
See application file for complete search history.

(56) References Cited

U.S. PATENT DOCUMENTS

| 4,910,871 A | * | 3/1990 | Logan ............................ 33/18.2 |
| 5,335,094 A | * | 8/1994 | Kaifu et al. ..................... 358/494 |
| 2001/0050305 A1 | * | 12/2001 | Pires et al. ....................... 229/75 |
| 2003/0016986 A1 | * | 1/2003 | Manduley ...................... 400/611 |
| 2003/0122892 A1 | * | 7/2003 | Lim .................................. 347/33 |

FOREIGN PATENT DOCUMENTS

JP    H05-094067    4/1993

* cited by examiner

*Primary Examiner* — Benny Q Tieu
*Assistant Examiner* — Martin Mushambo
(74) *Attorney, Agent, or Firm* — Nath Goldberg & Meyer; Jerald L. Meyer; Sanjana Mangalagiri

(57) ABSTRACT

An image forming machine includes an image data memory, an image data mapper, and a printer. For an envelope, the image data memory stores image data to be printed on a back of the body and a face of the flap, as backside image data. Based on this data, the image data mapper generates print data including a first print data to be printed on the body back and a second print data to be printed on the flap face. The printer prints a part of the backside image data on the body back in accordance with the first print data, and a remaining part of the backside image data on the flap face in accordance with the second print data.

8 Claims, 13 Drawing Sheets

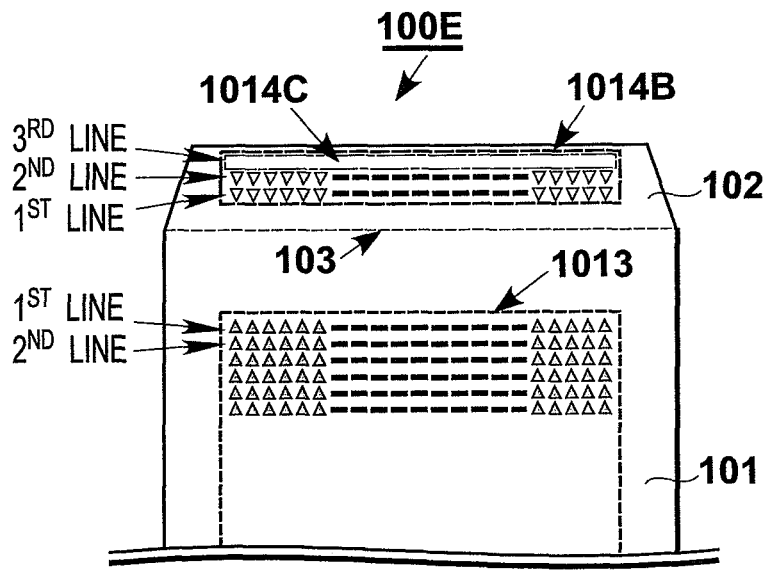
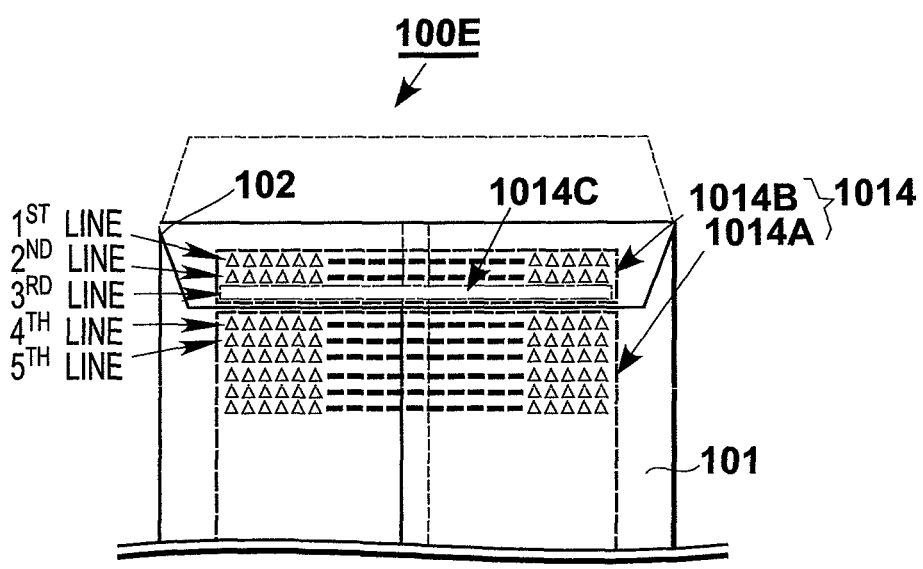

FIG. 9B REFLECTED LIGHT QUANTITY
TRANSFER DIRECTION

FIG. 10B TRANSMITTED LIGHT QUANTITY
TRANSFER DIRECTION

FIG. 11B TRANSMITTED LIGHT QUANTITY
TRANSFER DIRECTION

IMAGE FORMING APPARATUS WITH IMAGE DATA MAPPER

BACKGROUND OF THE INVENTION

1. Technical Field

The present invention relates to an image forming apparatus, and particularly, to an image forming apparatus adapted to make a print on an envelope.

2. Background Arts

There are remarkably widespread inkjet printers spread as image forming apparatuses capable of high-speed color printing, costing low. Most types of inkjet printers are connectable to a terminal, such as a personal computer, to take in image data, such as letters, illustrations, and marks, produced at the terminal, to print the images on sheets. Some composite types of inkjet printers have an integrated scanner for taking in image data as data through the scanner, to print them. Some composite types of inkjet printers have an integrated facsimile for receiving image data as data transferred to the facsimile, to print them.

Inkjet printers form images by printing on a recording medium such as a sheet of plain paper, photo paper, inkjet-oriented paper, mat paper, or an OHP film. Inlet printers employed for domestic services make a print on a selective one of recording mediums between the size of postcards and the size of A4 paper. Inkjet printers employed for office services make a print on a selective one of recording mediums between for instance the postcard size and the size of A3 paper.

Inkjet printers have enhanced performances such as print speed and print quality. Enhancements in such performances are accompanied by spread demands for using inkjet printers to print lots of envelopes for advertisement. Typically inkjet printers make a print on a single planer sheet of recording medium. It is therefore possible to adjust with ease a head gap between an array of print heads and a recording medium to be transferred in a printing section of an inkjet printer. The adjustable head gap affords to avoid interferences between the print head array and the recording medium. This allows for a printing free from troubles such as failures in transfer of recording medium (e.g. jamming), deformation of recording medium (e.g. turn-up), or degradation of print quality (e.g. stain).

However, since envelopes have a profile varied in part, it is difficult to have a head gap secured over the length or width of an envelope. As a result, variations in head gap tend to cause interferences between an envelope and print heads. This makes the printing of envelope difficult. Typical envelopes are each designed to enclose a flat object such as a letter or card, and produced as an enclosure from a four-sided sheet, by folding three of four triangular corners of the sheet around a central rectangular area. This enclosure includes a rectangle-faced body (referred herein to as an envelope body) that has the above three corners folded at three sides thereof and sealed to close on the reverse. The enclosure has one of the above four corners (referred herein to as a flap) to be folded to close at the remaining one side of the envelope body after an object such as a letter or card is enclosed. Accordingly, the envelope body includes those regions in which two sheet areas overlap each other, and those regions in which two or more glued sheet areas overlap another sheet area. As a result, the envelope body has a thickened profile varied in part even before enclosing an object. On the other hand, the flap extends as a single sheet area in the open state before being folded, in which the profile is thin. However, when the flap is folded back to close, it overlaps one or more sheet areas. In this state, the envelope has a profile thickened over those regions of the envelope body covered by the flap. The envelope may have an internal enclosure accommodated therein. In such a case, there may be an increased number of sheet areas overlapping each other. Inkjet printers may be used to print a destination's address, company name, personal name, and the like on a front side of an envelope, and a sender's address, company name, personal name, and the like on a backside of the envelope.

There has been disclosed in the Japanese Patent Application Laid-Open Publication No. 5-94067 an electro-photographic device for printing data such as an address and the like on a backside of an envelope having a flap in a closed state. This electro-photographic device has been devised to avoid hiding a part of the data printed on a backside of an envelope when a flap of the envelope is closed after the printing on the backside of the envelope having the flap left as it was open.

SUMMARY OF THE INVENTION

However, the above technique for electro-photographic devices lacked consideration for the following points. When put in the closed state, the flap was simply folded on the back of an envelope body of the envelope. The flap was not glued yet to the back of the envelope body, and had a tendency to float at a distal end of the folded area from the back of the envelope body. As a result, when printing, print heads tended to interfere with the flap. Such a situation might have caused a failure in transfer of envelope, deformation of envelope, or degradation of print quality, with an increased tendency.

To avoid interferences between a flap of an envelope and print heads, printing should be made on the back of an envelope body of the envelope in a flap-open state, in combination with printing made on the face of the flap. However, when the flap is closed after printing, a single image prepared should be consistently reconstructed as a combination of the image printed on the back of the envelope body and the image printed on the face of the flap.

The present invention has been made to address the foregoing issues. It is an object of the present invention to provide an image forming apparatus adapted to print a consistent single image on a combination of a back of an envelope body of an envelope and a face of a flap of the envelope. The image forming apparatus prevents interferences between the flap of the envelope and a print head array. The image forming apparatus allows for a printing free from failures in transfer of envelope, deformation of envelope, or degradation of print quality.

To achieve the object, according to an embodiment of the present invention, there is provided an image forming apparatus including an image data memory, an image data mapper, and a printer. The image data memory is operable to store image data to be printed on a back of a body of an envelope and a face of an open flap of the envelope. The image data is stored as backside image data of the envelope in a closed state having the flap folded on the back of the body. The image data mapper is operable to generate first backside image data to be printed on the back of the envelope body. The image data mapper is operable to further generate second backside image data to be printed on the face of the flap. The set of the first and second backside image data is generated on the basis of the backside image data stored in the image data memory. The printer is operable to print the first backside image data on the back of the envelope body. This printing is performed on the basis of the first backside image data generated at the image data mapper. The printer is operable to further print the second backside image data on the face of the flap. This printing is performed on the basis of the second backside image data generated at the image data mapper.

BRIEF DESCRIPTION OF THE DRAWINGS

FIG. 7A is an enlarged front side view of an envelope describing a method of forming a margin using the image forming machine according to the first embodiment FIG. 7B is an enlarged backside view of the envelope.

FIG. 9B is a graph showing a result of a size detection of the recording medium using a medium size detector of the image forming machine.

FIG. 10B is a graph showing a result of a profile detection of the envelope using a medium thickness detector of the image forming machine.

FIG. 11B is a graph showing a result of a shape detection of the envelope using a medium shape detector of the image forming machine.

DESCRIPTION OF THE EMBODIMENTS

Figure 1:
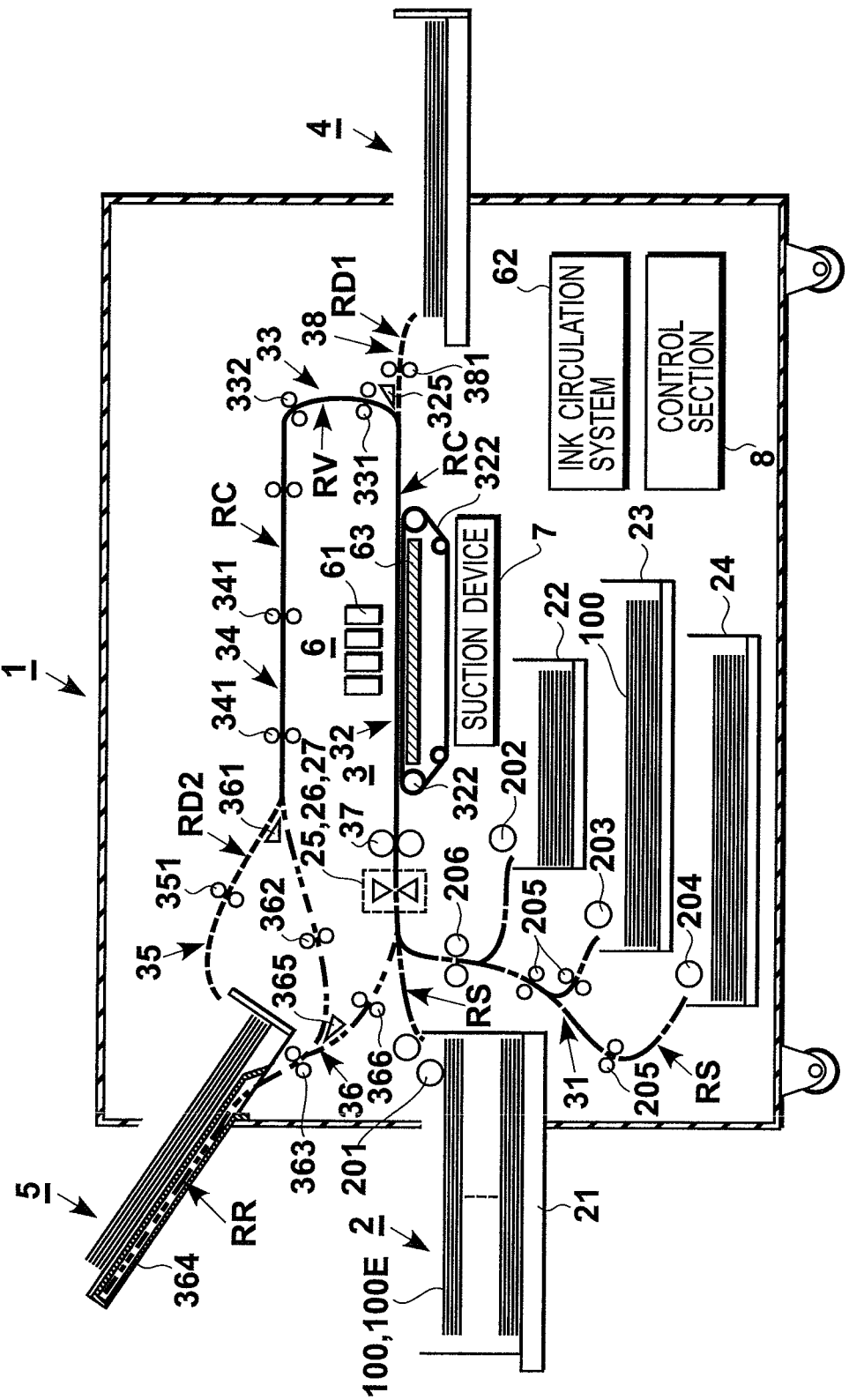
FIG. 1 is a schematic configuration diagram of an image forming machine according to a first embodiment of the present invention.

There will be described embodiments of the present invention with reference to the drawings. In the drawings, the same or similar parts are designated at the same or similar reference signs. It is noted that drawings show what is typical, not real.

The embodiments described will be illustrative to show specific apparatuses or methods implementing a technical concept according to this invention. The technical concept of this invention does not restrict arrangements of components or the like to what is described below. The technical concept of the present invention can be modified in various manners within the scope of claims.

First Embodiment

Description is now made of an image forming machine as an image forming apparatus according to a first embodiment of the present invention that is an example in which the invention is applied to an inkjet printer. The inkjet printer is now assumed as a color inkjet printer adapted to make a print using a cyan ink, a magenta ink, a yellow ink, and a black ink. It is noted that the present invention is applicable not simply to color inkjet printers but also to monochrome inkjet printers, including gray scales.

[Configuration of Image Forming Machine]

FIG. 1 shows an image forming machine 1 according to the first embodiment. The image forming machine 1 includes a medium feed system 2, a medium transfer system 3, right and left medium discharge systems 4 and 5, a printer 6, and a control section 8. The medium feed system 2 feeds a recording medium 100. The medium transfer system 3 transfers a recording medium 100 fed from the medium feed system 2. The printer 6 makes a print on a recording medium 100 being transferred by the medium transfer system 3. The medium discharge systems 4 and 5 are selective to discharge a printed recording medium 100 or unprinted recording medium 100. The control section 8 is adapted to control operations of the image forming machine 1 including those systems.

The medium feed system 2 includes medium feed trays 21 to 24, while the number as well as the arrangement is unrestricted. The image forming machine 1 is provided with a machine housing that has, at the left lateral side given no reference sign, a medium feed tray 21 as a feed rack detachably attached thereto, and projected outside the machine housing. The machine housing has therein medium feed trays 22, 23, and 24 arranged in a stacked manner. The medium feed trays 21 to 24 each have a number of unprinted recording mediums 100 (prepared for print) put therein.

The medium discharge system 4 includes a medium stacker disposed at a right lateral side of the machine housing and projected outside the machine housing. This medium stacker serves as a face-up stacker to stack thereon printed or unprinted recording mediums 100 discharged with their faces up. The medium discharge system 5 includes a medium stacker disposed at an upper left section of the housing of the image forming machine 1 and projected outside the machine housing. This medium stacker serves as a face-down stacker to stack thereon printed recording mediums 100 discharged (after print) with their printed sides down.

Generally, the recording mediums 100 used may be sheets of plain paper, photo paper, inkjet-oriented paper, or mat paper, or OHP films. According to the first embodiment, the image forming machine 1 is configured to use envelopes 100E as recording mediums 100, and make a print on each envelope 100E. The types and shapes of the envelopes 100E will be discussed later on.

The medium transfer system 3 includes a medium feeding subsystem 31, a print assisting transfer section 32, an upward transfer section 33, a horizontal transfer section 34, a medium discharging transfer section 35, and a switchback transfer section 36.

The medium feeding subsystem 31 includes a feed route system RS provided with feed rollers 201 to 204, and transfer rollers 205 and 206. The feed route system RS serves to feed a recording medium 100 (or an envelope 100E) from a selective one of the medium feed trays 21 to 24 in the medium feed system 2, to the print assisting transfer section 32 (up to a register roller 37). The feed rollers 201 to 204 are operable to feed the feed route system RS with a recording medium 100 picked up from a selective one of the medium feed trays 21 to 24. The transfer rollers 205 are operable for transfer of a recording medium 100 along the feed route system RS. The transfer rollers 206 also are operable for transfer of a recording medium 100 along the feed route system RS toward the register roller 37.

The print assisting transfer section 32 includes a common transfer route RC, a transfer belt 321, and a drive roller 322. The common transfer route RC serves for transfer of a recording medium 100 between the medium feeding subsystem 31 and the upward transfer section 33 (more specifically, from the register roller 37 to a front stage of a route selector 325). The transfer belt 321 is arranged in opposition to a print head array 61 in the printer 6. The transfer belt 321 is driven by the drive roller 322 to mode in a transfer direction.

There is a medium discharging transfer section 38 arranged at an end of the print assisting transfer section 32, that is, between the route selector 325 and the medium discharge system 4. The medium discharging transfer section 38 includes a discharge route RD1 provided with discharge rollers 381. The medium discharge route RD1 serves for transfer of a recording medium 100 conveyed thereto by the print assisting transfer section 32 after a print made thereon at the printer 6. The medium discharge route RD1 conducts the recording medium 100 through the route selector 325. The discharge rollers 381 are arranged to the medium discharge route RD1, and operable for transfer of a recording medium 100 along the medium discharge route RD1 to the medium stacker. In the image forming machine 1 according to the first embodiment, the medium discharging transfer section 38 constitutes part of the medium transfer system 3.

The upward transfer section 33 includes a vertical route RV provided with transfer rollers 331 and 332. The vertical route RV serves for transfer of a recording medium 100 from the print assisting transfer section 32 to the horizontal transfer section 34. The transfer rollers 331 and 332 are operable for transfer of a recording medium 100 along the vertical route RV. The upward transfer section 33 guides the recording medium 100 for a vertical transfer from the print assisting transfer section 32 to the horizontal transfer section 34 arranged thereabove in an overlapping manner.

The horizontal transfer section 34 includes a common transfer route RC provided with transfer rollers 341. The common transfer route RC serves for transfer of a recording medium 100 from the upward transfer section 33 to a selective one of the medium discharging transfer section 35 and the switchback transfer section 36 (more specifically, up to a switchback selector 361). The transfer rollers 341 are operable for transfer of a recording medium 100 along the common transfer route RC.

The medium discharging transfer section 35 includes a discharge route RD2 provided with discharge rollers 351. The discharge route RD2 serves for transfer of a recording medium 100 from an end of the horizontal transfer section 34, that is, from the switchback selector 361 to the medium discharge system 5. The discharge rollers 351 are operable for transfer of a recording medium 100 along the medium discharge route RD2 to the medium stacker. The medium discharging transfer section 35 is operable to transfer a recording medium 100 printed on one side, and a recording medium 100 printed on both sides.

The switchback transfer section 36 includes a switchback section 364, a reverse transfer route RR, a reverse route selector 365, and transfer rollers 362, 363, and 366. The switchback section 364 is operable to reverse the transfer direction of a recording medium 100. The reverse transfer route RR serves for transfer of a recording medium 100 from the switchback selector 361 at an end of the horizontal transfer section 34, through the switchback section 364, again to the print assisting transfer section 32. The reverse route selector 365 is operable to guide a recording medium 100 transferred thereto from the horizontal transfer section 34, into the switchback section 364, or to guide a recording medium 100 to be transferred from the switchback section 364 to the print assisting transfer section 32. The transfer rollers 362, 363, and 366 are operable for transfer of a recording medium 100 along the reverse transfer mute RR. The switchback transfer section 36 is operable to reverse a one-side printed recording medium 100, by putting it on the route with the printed side down. Then, the recording medium 100 put in this state is transferred to the print assisting transfer section 32, where its unprinted side is printed to finish a two-side printing.

The printer 6 includes an array of print heads 61 arranged over the common transfer route RC of the print assisting transfer section 32. The print head array 61 is arranged as an inkjet print head set with non-depicted arrays of ink discharge nozzles disposed at the common transfer route RC side, to propel ink droplets from ink discharge nozzles onto a recording medium 100. The print head array 61 is composed of a matrix of print heads including columns of print heads and rows of print heads. The columns of print heads are arrayed along the common transfer route RC, to discharge different colors of ink. The rows of print heads are arrayed in a direction crossing (perpendicularly, in this case) the common transfer route RC, to discharge identical colors of ink. In other words, the image forming machine 1 according to the first embodiment is adapted to work as a color inkjet printer employing a line print system including a print head array 61. This array 61 discharges a cyan ink, a magenta ink, a yellow ink, and a black ink to make a print in the unit of a line.

The image forming machine 1 according to the first embodiment includes an ink circulation system 62. This circulation system 62 is adapted to supply ink to the print head array 61, collect surplus ink unused for the printing, and re-circulate collected ink. This system 62 is composed of sub-systems individually operable for circulation of different colors of ink, four colors of ink in this case. The control section 8 controls operations of the print head array 61 and the ink circulation system 62.

At the printer 6, the transfer belt 321 is an endless go-around belt stretched along the common transfer route RC to travel on a surface of a platen plate 63. The transfer belt 321 loads (feeds) a recording medium 100 in position above the platen plate 63, and unloads (discharges) a printed recording medium 100 from above the platen plate 63.

Under the platen plate 63 (underneath the backside in FIG. 1), there is a suction device 7 disposed in opposition to the print head array 61 about the common transfer route RC. The suction device 7 has a function of drawing air through non-depicted suction holes in the transfer belt 321, to suction a recording medium 100 fed to the printer 6, toward the platen plate 63, to make a print thereon. In the first embodiment, the suction device 7 employs an air suction fan. In the first embodiment, the suction device 7 is accommodated inside the housing of the image forming machine 1. Instead, there may be an external suction device installed outside the housing of the image forming machine 1 and connected through a suction duct to a space under the platen plate 63. The suction device 7 is electrically connected to the control section 8, whereby the suctioning of the suction device 7 is controlled.

The medium feeding subsystem 31 of the medium transfer system 3 has various detectors installed on the feed route system RS. In the image forming machine 1 according to the first embodiment, the feed route system RS has a medium size detector 25, a medium thickness detector 26, and an envelope shape detector 27. The medium size detector 25 has a function of detecting the size of a recording medium 100. The medium size detector 25 may be a reflected light sensor, for instance. The medium thickness detector 26 has a function of detecting the thickness of a recording medium 100. The medium thickness detector 26 may be a transmitted light sensor, for instance. The envelope shape detector 27 has a function of detecting the shape of an envelope 100E. The envelope shape detector 27 may be, for instance, a contact image sensor (CIS) small in size and adapted to make a precise detection.

It is noted that the image forming machine 1 according to the first embodiment is applicable not simply to line print systems that make a print in the unit of a line, but also to serial print systems that scan in a line direction to make a print.

[Basic Print Operations of Image Forming Machine]

The image forming machine 1 shown in FIG. 1 is adapted to make a print, as follows. First, at any one of the medium feed trays 21 to 24 in the medium feed system 2, an unprinted recording medium 100 stored therein is picked up to guide into the feed route system RS. This is made by using corresponding rollers among the feed rollers 201 to 204 of the medium feeding subsystem 31 in the medium transfer system 3. The recording medium 100 is transferred by using the transfer rollers 205 and 206 along the feed route system RS, to the register roller 37. During the transfer in the feed route system RS, the medium size detector 25 is used to detect a size of the recording medium 100, and the medium thickness detector 26 is used to detect a profile of the recording medium 100. If the recording medium 100 is an envelope 100E fed from any one of the medium feed trays 21 to 24, the envelope shape detector 27 is used to detect a shape of the envelope 100E during a transfer in the feed route system RS.

The register roller 37 is composed of a pair of rollers spaced from each other in a direction perpendicular to the feed route system RS. The register roller 37 has some functions including a function of adjusting the position of the leading end of a fed recording medium 100 in the feed direction, and a function of correcting alignment to the transfer direction. Any recording medium 100 (or envelope 100E) fed in position to the register roller 37 is once stopped there, to transfer to the print assisting transfer section 32 at a prescribed timing.

At the print assisting transfer section 32, the transfer belt 321 is moving at a transfer speed preset in accordance with a print condition. As the transfer belt 321 moves, a recording medium 100 put thereon travels along the common transfer route RC. Then, the recording medium 100 comes in position above the platen plate 63, when the print head array 61 of the printer 6 propels out droplets of ink as necessary to make a color print, a monochrome print, or a gray scale print.

A printed recording medium 100 is transferred along the common transfer route RC. For a discharge to the medium discharge system 4, the route selector 325 is operated to transfer the recording medium 100 to the medium discharging transfer section 38. The recording medium 100 transferred to the medium discharging transfer section 38 is discharged on the medium stacker at the medium discharge system 4.

For a discharge to the medium discharge system 5, the recording medium 100 is transferred to the upward transfer section 33, and to horizontal transfer section 34. For a one-side printing, the reverse route selector 325 is operated to transfer the recording medium 100 to the medium discharging transfer section 35, to straightly discharge at the medium discharge system 5. The recording medium 100 transferred to the medium discharging transfer section 35 is discharged on the medium stacker at the medium discharge system 5. For a two-side printing, the reverse mute selector 325 is operated to transfer the recording medium 100 from the horizontal transfer section 34 to the switchback transfer section 36. At the switchback transfer section 36, the recording medium 100 is transferred through the reverse transfer route RR to the switchback section 364. At the switchback section 364, the recording medium 100 is switch in transfer direction and reversed upside down, to transfer from the switchback section 364 again up to the register roller 37. After that, the recording medium 100 is transferred like the case of the one-side printing. That is, the recording medium 100 is transferred first to the print assisting transfer section 32, where it is printed. Then, the recording medium 100 is transferred through the upward transfer section 33, the horizontal transfer section 34, and the medium discharging transfer section 35, in this order. Finally, the recording medium 100 is discharged on the medium stacker at the medium discharge system 5.

[Envelope Types and Forms]

Figure 2A:
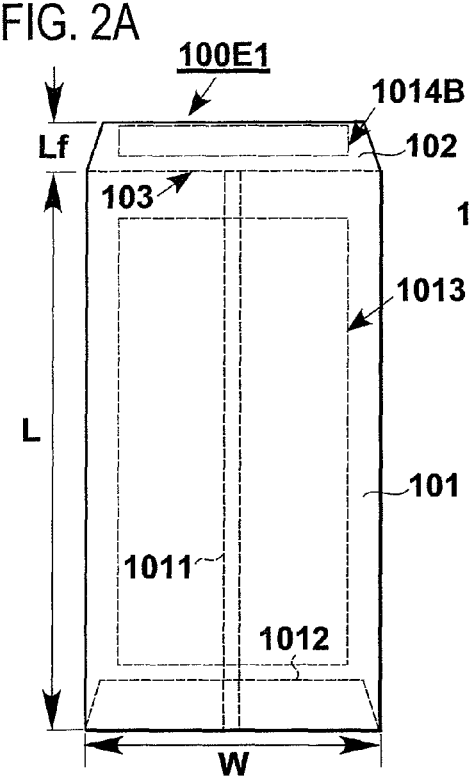
FIG. 2A is a front side view of an end-opening JIS N series envelope to be used as a recording medium in the image forming machine according to the first embodiment
Figure 2B:
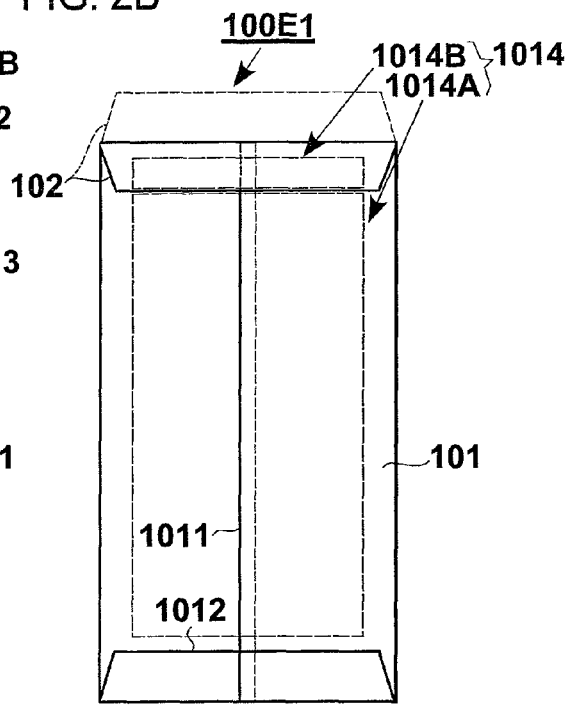
FIG. 2B is a backside view of the N series envelope.
Figure 3A:
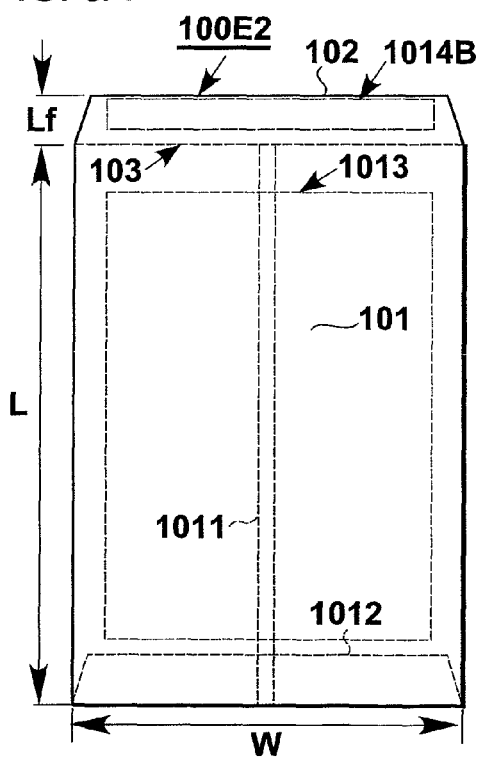
FIG. 3A is a front side view of an end-opening JIS K series envelope to be used as a recording medium in the image forming machine according to the first embodiment
Figure 3B:
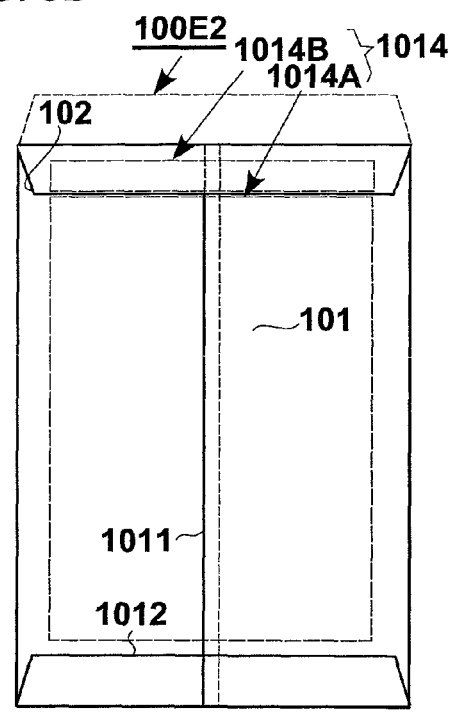
FIG. 3B is a backside view of the K series envelope.
Figure 4A:
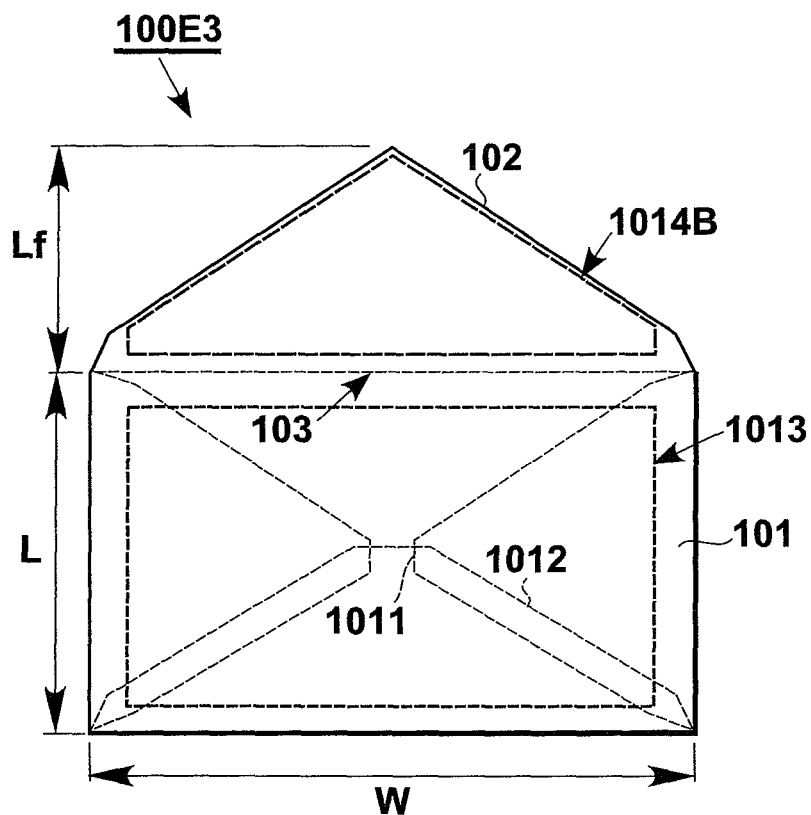
FIG. 4A is a front side view of a side-opening envelope to be used as a recording medium in the image forming machine according to the first embodiment
Figure 4B:
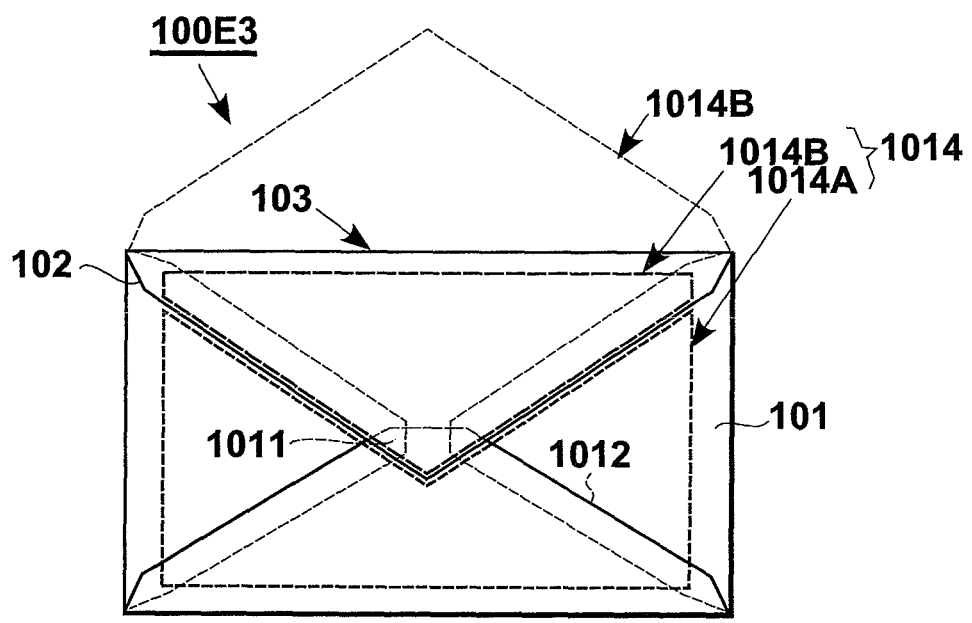
FIG. 4B is a backside view of the side-opening envelope.

For the image forming machine 1, envelopes 100E to be handled as recording mediums 100 can be classified into a group of end-opening envelopes and a group of side-opening envelopes. Typically, they fall within categories of end-opening JIS N series envelopes, end-opening JIS K series envelopes, and side-opening JIS Y series envelopes. FIG. 2A and FIG. 2B illustrate an N series envelope 100E1 that has a length L substantially equal to the double of a width W. FIG. 3A and FIG. 3B illustrate a K series envelope 100E2 that has a length L shorter than the double of a width W. FIG. 4A and FIG. 4B illustrate a Y series envelope 100E3 that has a length L shorter than a width W. The image forming machine 1 according to the first embodiment is adapted to make a print on any envelope 100E that falls under categories of N series envelopes 100E1, K series envelopes 100E2, and Y series envelopes 100E3.

The N series envelope 100E1 illustrated in FIG. 2A and FIG. 2B has a rectangle-faced envelope body 101 closed at three sides thereof, and an open flap 102 provided on the remaining one side (the top side in the figure) of the envelope body 101. The envelope body 101 is made from a paper form cut with a double width, by folding back two sides and a bottom lug thereof, in the form of a pocket for enclosing a flat object such as a letter or card. The paper form has a top lug extending as the flap 102, which will be folded to close after enclosure of an object. The envelope body 101 may have an internal envelope accommodated therein. The envelope body 101 has overlap regions 1011 at which one or more areas of paper are folded double or overlap each other. The envelope body 101 has thick regions 1012 at which two or more glued areas of paper overlap other overlap regions 1011. The envelope 100E1 is center-pasted, so the envelope body 101 has an overlap region 1011 extending along the vertical centerline. There may be an envelope side-pasted to have overlap regions 1011 extending along two of the three sides. The envelope 100E1 has a thick region 1012 extending along the bottom lug of the envelope body 101 in opposition to the flap 102. The bottom lug may be identical in shape to the flap 102, and pasted in advance.

FIG. 2A illustrates a front view of the N series envelope 100E1 showing faces of the envelope body 101 and the flap 102. On the face of the envelope body 101 a front side image data 1013 including a destination's address, company name, and personal name is printed. FIG. 2B illustrates a backside view of the N series envelope 100E1 showing a back of the envelope body 101 with the flap 102 folded thereon. On this backside of the envelope 100E1 a backside image data 1014 including a sender's address, company name, and personal name is printed.

The image forming machine 1 according to the first embodiment performs a two-side printing on the envelope 100E1 in a state in which the flap 102 is left as it is open. This can prevent interferences that might have occurred between the flap 102 and the print head array 61 in a printing on the envelope 100E1 if the flap 102 were folded on the back of the envelope body 101. That is, the backside image data 1014 is divided into one part 1014A thereof to be printed on the back of the envelope body 101, and another part 1014B thereof to be printed on the face of the flap 102. That part 1014A of the backside image data 1014 will not overlap the flap 102 when this is folded back. The other part 1014B of the backside image data 1014 is printed on the face of the open flap 102 in the course of printing the front side image data 1013 on the face the envelope body 101. This part 1014B of the backside image data 1014 can be seen on the face of the flap 102, as this is folded back. That part 1014A of the backside image data 1014 printed on the back of the envelope body 101 and the other part 1014B of the backside image data 1014 printed on the face of the flap 102 are connected with each other, constituting a single backside image data 1014. This connection completes when the flap 102 is folded on the back of the envelope body 101. In the single backside image data 1014, one part 1014A and the other part 1014B have image data such as letters oriented in a matching direction. Both the image data of the parts 1014A and 1014B are continuously connected with each other, without remarkable boundaries. They look as if a print on the back of the envelope body 101 and a print on the face of the flap 102 were concurrently made to the envelope 100E1 in a state in which the flap 102 is folded back.

Like the N series envelope 100E1 illustrated in FIG. 2A and FIG. 2B, the K series envelope 100E2 illustrated in FIG. 3A and FIG. 3B, as well as the Y series envelope 100E3 illustrated in FIG. 4A and FIG. 4B, has an envelope body 101 and a flap 102. Also in the K series envelope 100E2 as well as in the Y series envelope 100E3, the envelope body 101 has overlap regions 1011 and thick regions 1012 provided as illustrated. Like the case of the N series envelope 100E1, the K series envelope 100E2 as well as the Y series envelope 100E3 has a front side image data 1013 thereof and a backside image data 1014 thereof. The front side image data 1013 is printed on the face of the envelope body 101. One part 1014A of the backside image data 1014 is printed on the back of the envelope body 101, and another part 1014B of the backside image data 1014 is printed on the face of the flap 102 in an open state.

It is noted that the type as well as the size of an envelope 100E to be used is not limited to what has been described above. For instance, the envelope 100E may be a window envelope that has a window opened in the face of an envelope body 101 and covered with a transparent film. The window envelope may be an end-opening envelope that has a length substantially equal to or shorter than a double width. Further, the window envelope may be a side-opening envelope.

[Control System of Image Forming Machine]

Figure 5:
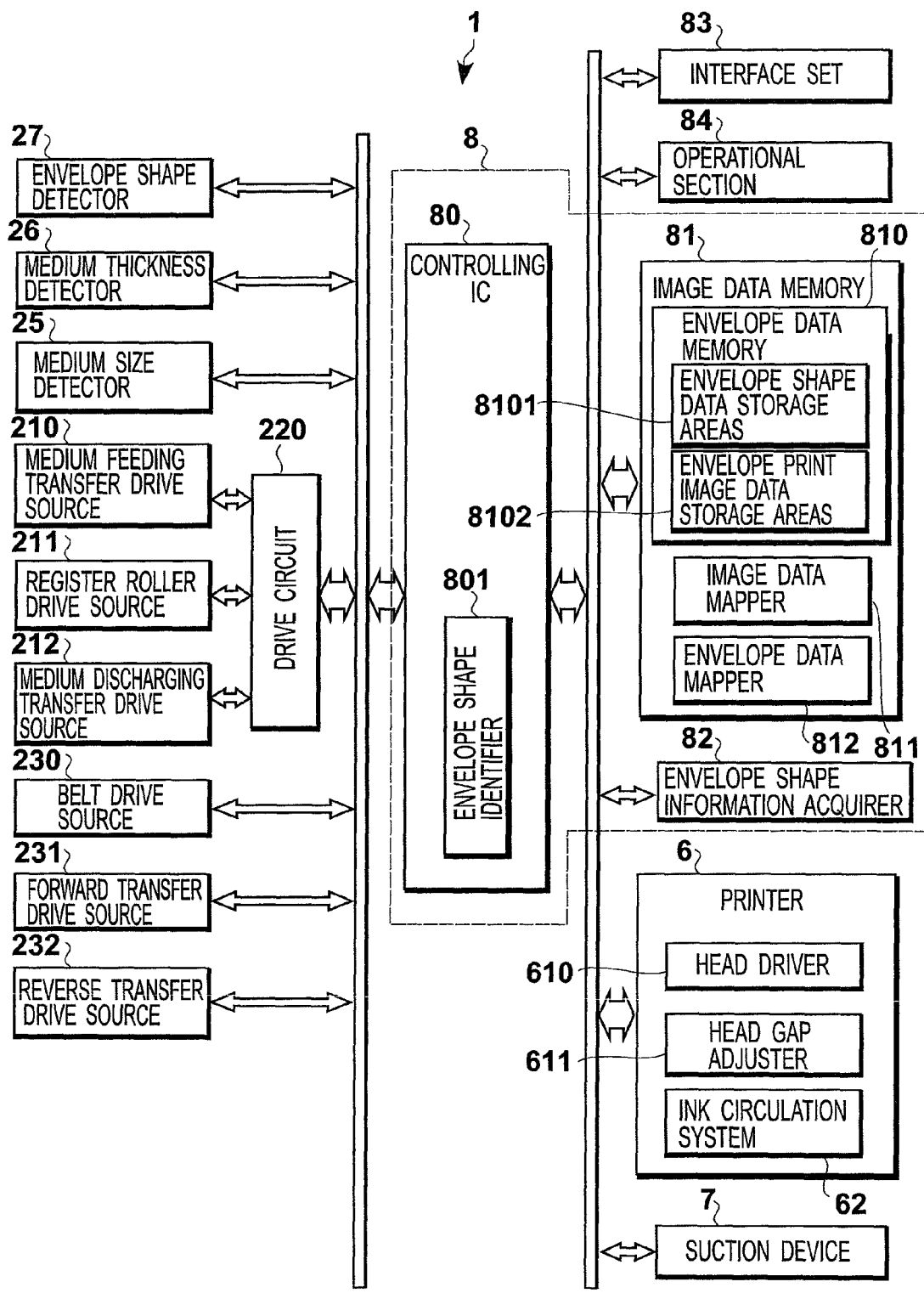
FIG. 5 is a system configuration diagram of the image forming machine according to the first embodiment.

As shown in FIG. 5, the image forming machine 1 according to the first embodiment has a control system including the control section 8, an operational section 84, an interface set 83. The control section 8 has a set of control elements including a controlling IC 80 (as a central processing unit for control), a image data memory 81 as a memory for storing image data, and an envelope shape information acquirer 82. The control section 8 including the control element set is connected with constituent elements of the control system, as necessary. The controlling IC 80 governs control of the image data memory 81, the envelope shape information acquirer 82, the interface set 83, and the operational section 84.

The image data memory 81 in the control section 8 has an envelope data memory 810, an image data mapper (expander) 811, and an envelope data mapper (expander) 812 as an image data mapper (expander) for envelopes. The envelope data memory 810 has envelope shape data storage areas 8101 (as memory areas for storing data on shapes of envelopes to be used) and envelope print image data storage areas 8102 (as memory areas for storing image data to be printed on envelopes).

The controlling IC 80 in the control section 8 is connected with various detectors provided in the medium feeding subsystem 31, including the medium size detector 25, the medium thickness detector 26, and the envelope shape detector 27. Moreover, the controlling IC 80 is connected with a drive circuit 220. The drive circuit 220 is connected to a medium feeding transfer drive source 210, a register roller drive source 211, and a medium discharging transfer drive source 212. Further, the controlling IC 80 is connected with a belt drive source 230, a forward transfer drive source 231, and a reverse transfer drive source 232.

In addition, the controlling IC 80 is connected with the printer 6 and the suction device 7. The printer 6 includes a head driver 610, a head gap adjuster 611, and the ink circulation system 62. These elements also are connected to the controlling IC 80.

The interface set 83 is connected to non-depicted external terminals installed outside the image forming machine 1, via a communication network such as a wired or wireless LAN, telephone line, or cable. The interface set 83 serves for reception of image data transmitted from an external terminal that may be a personal computer, for instance. The interface set 83 serves also for reception of image data taken in by a scanner incorporated in the machine 1, or sent from a facsimile incorporated in the machine 1. The interface set 83 may serve to transmit, to an external terminal or external facsimile, image data taken in by the incorporated scanner as well as data on the progress of a print job. Further, the interface set 83 may have a slot for portable memories such as a USB memory or card memory, and serve to take in image data stored in a portable memory.

The operational section 84 inch ides a power switch and an operation panel provided for user's operations such as those for startup, suspension, shutdown, printing, image data take-in, and image data transmission and reception of the image forming machine 1. The operational section 84 is operable when making a print on a recording medium 100, to set up the type and size, and printing conditions such as those for color printing, monochrome printing, or gray scale printing. The operational section 84 is operable also when making a print on an envelope 100E, to set up the type and size, and printing conditions such as those for color printing, monochrome printing, or gray scale printing.

The image data memory 81 is adapted to store therein image data taken in or received through the interface set 83. The image data memory 81 stores image data to be printed on recording mediums 100, and the envelope data memory 810 of the image data memory 81 stores image data to be printed on envelopes 100E.

The envelope data memory 810 has data on shapes of envelopes 100E stored in envelope shape data storage areas 8101. Here, for any envelope 100E, the shape data includes a data on the type and a data on the size. For instance, for the JIS-compliant N series envelope 100E1 illustrated in FIG. 2A and FIG. 2B, the shape data includes a data on the type, and a data on a size of the envelope body 101. In this case, the type data may be 'N4', and the size data may cover the length L of a dimension of '205 mm' and the width W of a dimension of '90 mm' of the envelope body 101 of that type. In the image forming machine 1 according to the first embodiment, the shape data further includes a data on a length Lf the flap 102, which may be a dimension of '20 mm', for instance. Such a shape data is stored for each type of envelopes 100E to be used.

The envelope data memory 810 has image data of envelopes 100E stored in envelope print image data storage areas 8102. For the N series envelope 100E1 illustrated in FIG. 2A and FIG. 2B, the image data include a set of front side image data 1013 to be printed on the face of the envelope body 101 and a backside image data 1014. This backside image data 1014 includes image data of one part 1014A of the backside image data to be printed on the back of the envelope body 101, and image data of another part 1014B of the backside image data to be printed on the face of the flap 102. The image data stored in envelope print image data storage areas 8102 include similar sets of image data also for the K series envelope 100E2 illustrated in FIG. 3A and FIG. 3B, and for the Y series envelope 100E3 illustrated in FIG. 4A and FIG. 4B. That is, for each of the envelope 100E7 and the envelope 100E3, the image data include a set of a front side image data 1013 to be printed on the face of the envelope body 101, and a backside image data 1014. This backside image data 1014 includes image data of one part 1014A of the backside image data to be printed on the back of the envelope body 101, and image data of another part 1014B of the backside image data to be printed on the face of the flap 102.

The image data mapper 811 is composed of a set of storage areas serving for mapping thereon a set or paired sets of image data read from the image data memory 81 as a set of image data or paired set of image data to be printed on one side or both sides of a recording medium 100. Those data exclude data to be printed on both sides of any envelope 100E. The image data mapper 811 stores therein a set or paired sets of generated print data. For each print data set, the generation is made on the image data mapper 811, by mapping an image data set read from the image data memory 81 into a matrix of bit map data pixel-wise associated with pixel values of the image data set. The image data mapper 811 may involve circuitry adapted for internal generation of a print data set. In the first embodiment, the image data mapper 811 cooperates with the controlling IC 80 for executing a program to generate a print data set to be stored. This program may be stored in part of the image data mapper 811 or in a non-depicted memory incorporated in the controlling IC 80.

The envelope data mapper 812 has substantially the same configuration and function as the image data mapper 811. That is, the envelope data mapper 812 is composed of a set of storage areas serving for sequentially mapping thereon paired sets of image data. The paired sets of image data are read from envelope print image data storage areas 8102 of the envelope data memory 810 as a combination of front side image data 1013 and backside image data 1014 to be printed on both sides of an envelope 100E. The envelope data mapper 812 stores therein a pair of sets of generated envelope print data. This generation of envelope print data is made on the envelope data mapper 812, like the generation of print data described above. For each envelope print data set, the generation is made by mapping an image data set read from envelope print image data storage areas 8102 into a matrix of bit map data pixel-wise associated with pixel values of the image data set. The envelope data mapper 812 may involve circuitry adapted for internal generation of an envelope print data set. In the first embodiment, the envelope data mapper 812 cooperates with the controlling IC 80 for executing a program to generate an envelope print data set to be stored. This program may be stored in part of the envelope data mapper 812 or in a non-depicted memory incorporated in the controlling IC 80.

Figure 6A:
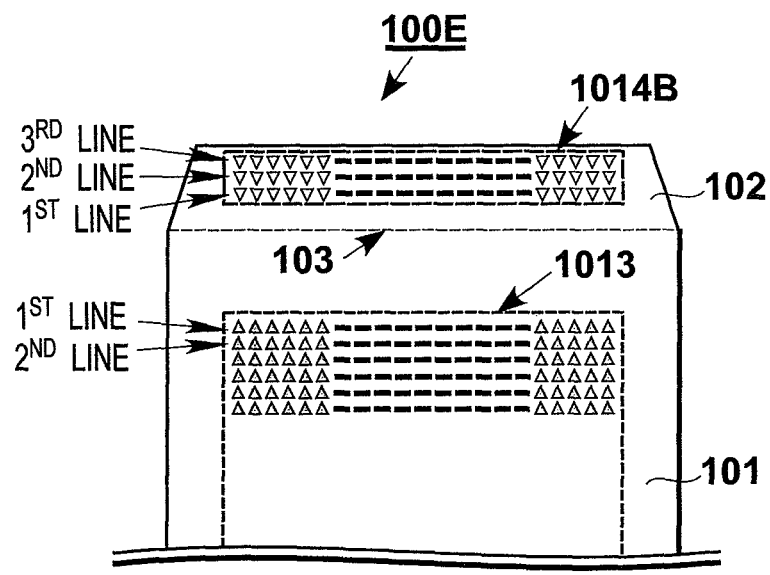
FIG. 6A is an enlarged front side view of an envelope used as a recording medium in the image forming machine according to the first embodiment
Figure 6B:
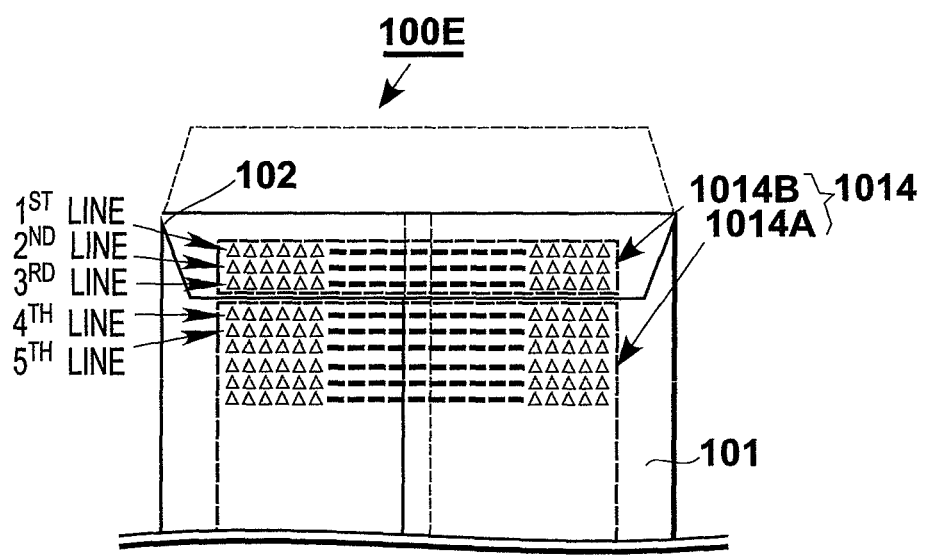
FIG. 6B is an enlarged backside view of the envelope.

Further, according to the first embodiment, one of the pair of sets of envelope print data stored in the envelope data mapper 812 constitutes a backside image data 1014 on the backside of an envelope 100E in a closed state. That is, one set of envelope print data constitutes a single backside image data 1014 when a flap 102 of the envelope 100E is folded on the back of a body 101 of the envelope 100E, as illustrated by FIG. 6A and FIG. 6B. This set of envelope print data is generated as a combination of a first print data to be printed on the back of the envelope body 101 and a second print data to be printed on the face of the flap 102. Both the first and second print data are stored in the envelope data mapper 812. For each envelope 100E, the backside image data 1014 is divided into first backside image data as a part 1014A thereof to be printed on the back of a body 101 of the envelope 100E and second backside image data as another part 1014B thereof to be printed on the face of a flap 102 of the envelope 100E. This division is based on a shape of the envelope 100E (including a shape of the flap 102 defined by geometrical features and dimensions) stored in an envelope shape data storage area 8101 of the envelope data memory 810. The first backside image data is mapped on the envelope data mapper 812 to generate the first print data stored therein. The second backside image data is mapped on the envelope data mapper 812 to generate the second print data stored therein. There is a program operable on the controlling IC 80 to execute the division of a backside image data 1014 and the generation of first print data and second print data. This program may be stored in part of the envelope data mapper 812 or in a non-depicted memory incorporated in the controlling IC 80. It is noted that the first print data covering the first backside image data 1014A of the backside image data 1014 is printed on the backside of an envelope 100E in a stretched state in which a flap 102 is open. The second print data covering the second backside image data 1014B of the backside image data 1014 is combined with the print data of the front side image data, to print together on the front side of the envelope 100E in the stretched state.

In the image forming machine 1 according to the first embodiment, an envelope 100E (of the N series, the K series, or the Y series, for instance) is automatically driven to transfer beyond the switchback transfer section 36 (see FIG. 1) to execute a two-side printing. In this case, the envelope 100E has a direction of transfer switched back from a transfer direction for printing on one side, to a transfer direction for printing on another side. The former printing makes a print on one of a front-side and a backside of the envelope 100E. The latter printing makes a print on the other side of the envelope 100E. For instance, the envelope 100E may travel with a flap 102 in a leading position in a transfer direction for a one-side printing to make prints on a face of the flap 102 and a face of an envelope body 101. Afterward, the envelope 100E may travel with the flap 102 in a trailing position in a transfer direction for a printing to make a print on a back of the envelope body 101. In such a printing method, the envelope data mapper 812 is operable to map thereon paired image data sets of a front side image data 1013 and a backside image data 1014, into paired print data sets to be stored therein. The paired print data sets include first print data covering the front side image data 1013 to be printed on the front side of an envelope 100E. The paired print data sets further include second print data covering the backside image data 1014 to be printed on the backside of the envelope 100E. The second print data has first data covering a first backside image data 1014A of the backside image data 1014 to be printed on a back of a body 101 of the envelope 100E. Further, the second print data set has second data covering a second backside image data 1014B of the backside image data 1014 to be printed on a face of a flap 102 of the envelope 100E. As illustrated by FIG. 6A and FIG. 6B, the second backside image data 1014B is rotated at 180 degrees relative to the first backside image data 1014A. The second backside image data 1014B is rotated at 180 degrees also to the front side image data 1013 to be printed on a face of the envelope body 101.

Further, there may be an envelope 100E (of the Y series, the N series, or the Kseries, for instance) subjected to a one-side printing to make prints on a face of a body 101 of the envelope 100E and a face of a flap 102 of the envelope 100E, followed by a manual printing. The manual printing may be a one-side printing to make a print on a back of the envelope body 101. In the manual printing, the envelope 100E may be rotated at 90 degrees or 270 degrees (i.e. at right angles) relative to the transfer direction for one-side printing. In such a printing method, the envelope data mapper 812 has a second print data generated thereon and stored therein. The second print data has second data covering second backside image data 1014B of backside image data 1014 to be printed on a face of a flap 102 of an envelope 100E. The second backside image data 1014B is rotated at 90 degrees or 270 degrees relative to a first backside image data 1014A of the backside image data 1014 to be printed on a back of a body 101 of the envelope 100E. The afore-mentioned printing methods may be selected automatically, or by use of the operational section 84 for a user's direct operation. For the automatic selection, a non-depicted external terminal (e.g. a personal computer) may be used to prepare paired image data sets, and a command for selection may be edited in a print job including the image data sets.

According to the first embodiment, the envelope data mapper 812 is operable to eliminate a sub-region of a second backside image data 1014B of a backside image data 1014 along a peripheral region on the face of a flap 102, as illustrated by FIG. 7A and FIG. 7B. The elimination of a sub-region provides a corresponding margin 1014C. The envelope data mapper 812 is operable to generate thereon a second print data covering a second backside image data 1014B with a margin 1014C inclusive, and store therein the second print data. In the illustrated example, a margin 1014C is produced on a line area of a third line of pixels in a second backside image data 1014B of a backside image data 1014 that constitutes a leading line in the transfer direction when printing the second backside image data 1014B on a face of a flap 102. This margin 1014C is produced by eliminating a corresponding sub-region of the second backside image data 1014B. In the area of the line constituting a leading line in the transfer direction, air is entrained by an envelope 100E being transferred. Around the line area, air is forced to flow with increased velocities when the envelope 100E is suctioned onto the transfer belt 321 by using the suction device 7. There are droplets of ink propelled out of ink discharge nozzles of print heads 61, which may have deviated tracks, as air velocity is increased. As a result, ink might have tended to adhere on edges of the flap 102 with a degraded print quality (reduced image quality). Further, ink mist might have tended to occur with the more stained envelope 100E. The margin 1014C can be free from droplets of ink striking thereon, and free from ink droplets having deviated tracks, thus permitting the print quality to be enhanced. Further, the occurrence of ink mist can be reduced, effectively preventing the envelope 100E from being stained.

Figure 8A:
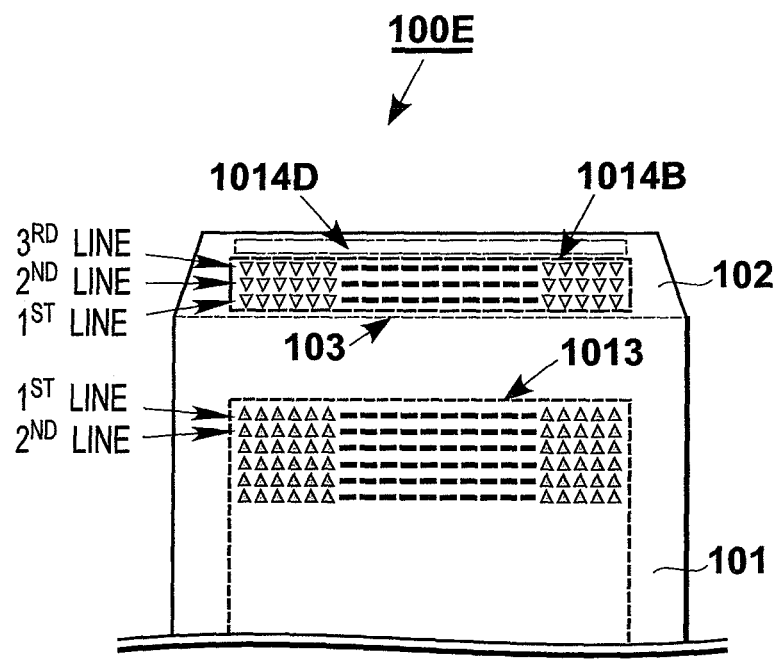
FIG. 8A is an enlarged front side view of an envelope describing another method of forming a margin using the image forming machine according to the first embodiment
Figure 8B:
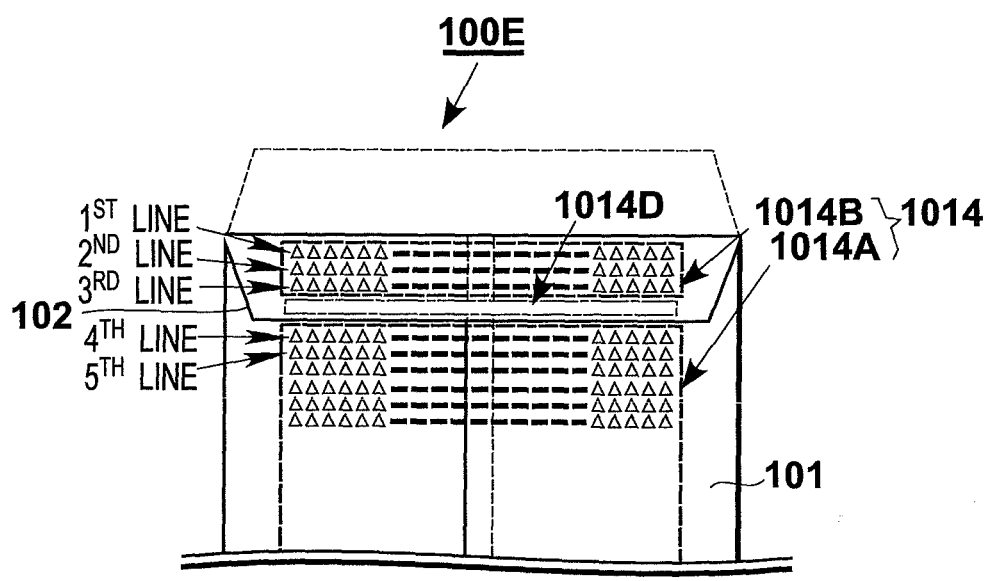
FIG. 8B is an enlarged backside view of the envelope.

Further, according to the first embodiment, the envelope data mapper 812 is operable to translate a second backside image data 1014B of a backside image data 1014 as illustrated by FIG. 8A and FIG. 8B. This translation is made from the peripheral region end of a face of a flap 102 of an envelope 100E toward a fold region 103 between the face of the flap 102 and a face of a body 101 of the envelope 100E. The translation provides a corresponding margin 1014D in a peripheral region on the face of the flap 102. The envelope data mapper 812 is operable to generate thereon a second print data covering a second backside image data 1014B with the margin 1014D inclusive, and store therein the second print data. The margin 1014D is produced on an area corresponding to an inherent line area of a third line of pixels in a second backside image data 1014B of a backside image data 1014 that constitutes a leading line in the transfer direction when printing the second backside image data 1014B on the face of the flap 102. This margin 1014D is produced by closing up a first to the third line of pixels in the columnar direction, as necessary. Like the margin 1014C, the margin 1014D can be free from droplets of ink striking thereon, and free from ink droplets having deviated tracks, thus permitting the print quality to be enhanced. Further, the occurrence of ink mist can be reduced, effectively preventing the envelope 100E from being stained.

The image forming machine 1 according to the first embodiment may have either a function of eliminating a sub-region of image data to produce a margin 1014C, or a function of closing up pixel lines to produce a margin 1014D. Instead, the image forming machine 1 may have both of the functions, in a selective manner. The selection between the margin 1014C and the margin 1014D may be made automatically, or by use of the operational section 84 for a user's direct operation. For the automatic selection, a non-depicted external terminal may be used to prepare paired image data sets, and a command for selection may be edited in a print job including the image data sets.

According to the first embodiment, the image data memory 81 is configured as a memory device including an envelope data memory 810, an image data mapper 811, and an envelope data mapper 812. For instance, the memory device may be a hard disc of a large capacity. The memory device may be composed of a single hard disc including storage area sets allotted to serve as an envelope data memory 810, an image data mapper 811, and an envelope data mapper 812. The memory device may be composed of hard discs assigned to individual services. The memory device may be replaced by a non-volatile memory. The memory device composed of hard discs may be partially replaced by a non-volatile memory.

Figure 9A:
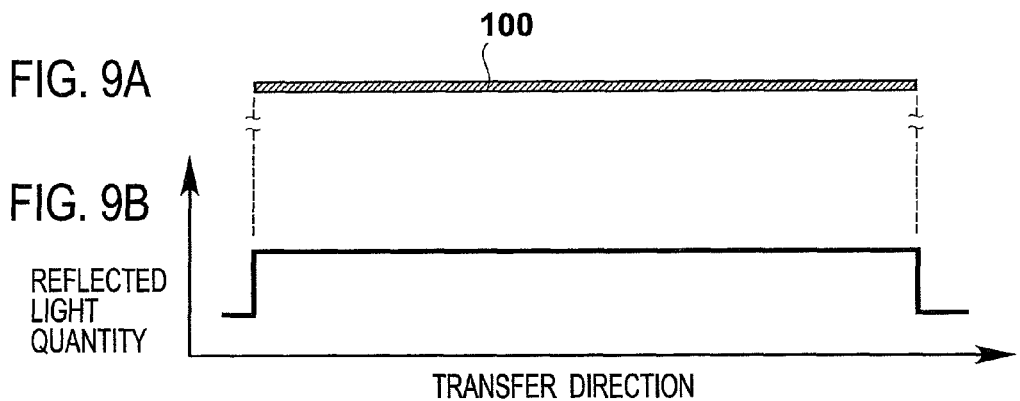
FIG. 9A is a sectional view of a recording medium used in the image forming machine according to the first embodiment

The medium transfer system 3 has a medium size detector 25, a medium thickness detector 26, and an envelope shape detector 27 respectively disposed in the medium feeding subsystem 31 and connected to the controlling IC 80 in the control section 8. The medium size detector 25 is mainly used to detect sizes of recording mediums 100. As illustrated by FIG. 9A and FIG. 9B, the medium size detector 25 is adapted to detect a size of a recording medium 100 on the basis of a difference in reflected light quantity of the recording medium 100 as it is fed in the feed route system RS. The detection signal is output to the controlling IC 80.

Figure 10A:
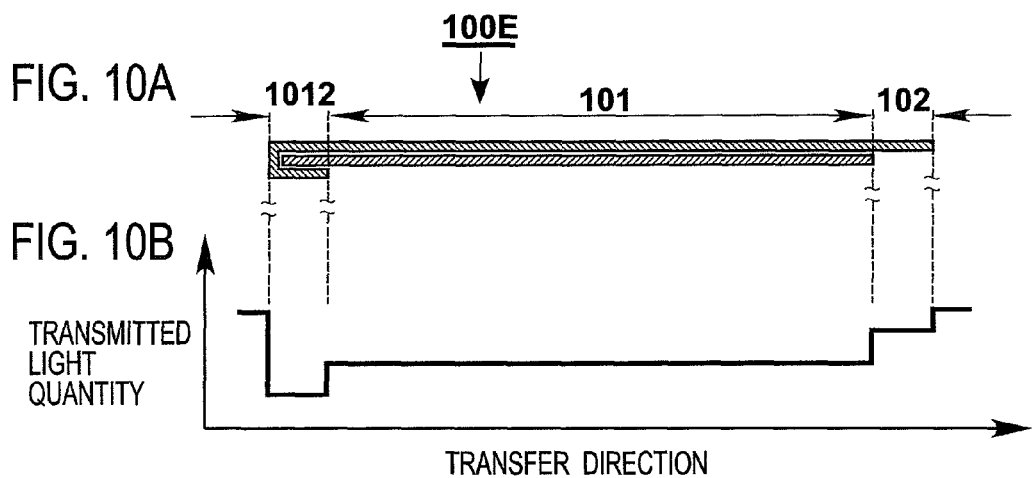
FIG. 10A is a sectional view of an envelope used in the image forming machine according to the first embodiment

The medium thickness detector 26 is used to detect profiles of recording mediums 100, and detect profiles of envelopes 100E. As illustrated by FIG. 10A and FIG. 10B, the medium thickness detector 26 is adapted for detecting a distribution of transmitted light quantity of a recording medium 100 or envelope 100E, to detect a profile of the recording medium 100 or envelope 100E as it is fed in the feed route system RS. The envelope 100E has a flap 102 composed of a single sheet of paper, where the transmitted light quantity is large. The envelope 100E has a body 101 including a region made of two sheets of paper, where the transmitted light quantity is intermediate. The body 101 has a region 1012 made of three or more sheets of paper, where the transmitted light quantity is small. Accordingly, the medium thickness detector 26 is adapted to detect the flap 102, the envelope body 101, and the region 1012 of laminated paper sheets, on the basis of a difference in transmitted light quantity. The detection signal is output to the controlling IC 80.

Figure 11A:
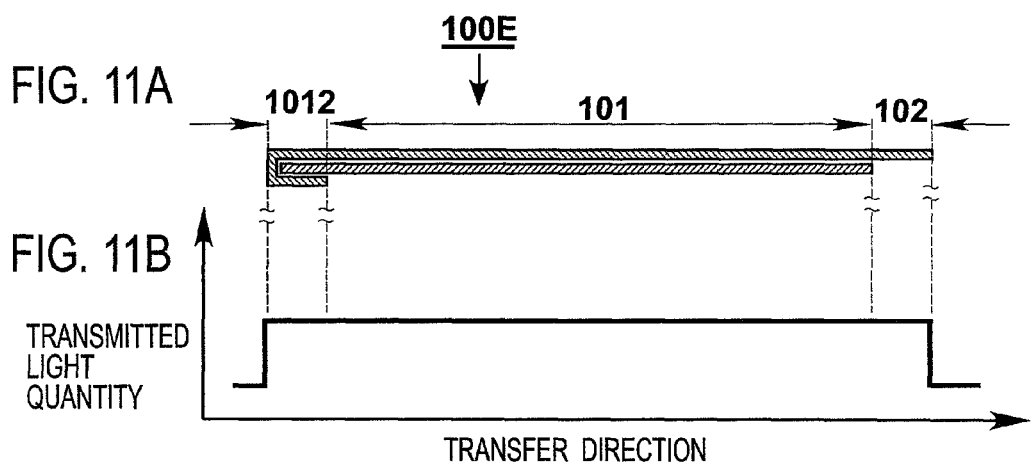
FIG. 11A is a sectional view of an envelope used in the image forming machine according to the first embodiment

The envelope shape detector 27 is used mainly to detect shapes of envelopes 100E. As illustrated by FIG. 11A and FIG. 11B, the envelope shape detector 27 is adapted to detect a shape of an envelope 100E by detecting a difference in reflected light quantity (or transmitted light quantity) of the envelope 100E as it is fed in the feed route system RS. The detection signal is output to the controlling IC 80.

The image forming machine 1 according to the first embodiment has both of the medium size detector 25 and the envelope shape detector 27. The medium size detector 25 as well as the envelope shape detector 27 is able to detect sizes of a recording medium 100 and an envelope 100E. Therefore, the image forming machine 1 may simply have one of them.

The envelope shape information acquirer 82 shown in FIG. 5 is operable to acquire shape information on an envelope 100E on the basis of a detection result of the envelope shape detector 27. The shape information of envelope 100E can be acquired on the basis of a detection result of the medium size detector 25. There may be a passing operation of a lot of envelopes 100E of a type and a shape, followed by a printing to the envelopes 100E. The passing operation involves no printing. This operation employs the medium transfer system 3 to simply pass envelopes 100E from the medium feed system 2 through the printer 6 to the medium discharge system 4 or 5. During the passing operation, shape information of envelope 100E is acquired.

The drive circuit 220 is operable with control signals from the control section 8 (more specifically, from the controlling IC 80), to drive the medium feeding transfer drive source 210, the register roller drive source 211, and the medium discharging transfer drive source 212. The medium feeding transfer drive source 210 serves to drive feed rollers 201 to 204 for the medium feeding subsystem 31. The register roller drive source 211 serves to drive register rollers 37. The medium discharging transfer drive source 212 serves to drive discharge rollers 381 for the medium discharging transfer section 381. The medium discharging transfer drive source 212 serves to drive discharge rollers 351 for the medium discharging transfer section 35. The medium feeding transfer drive source 210, the register roller drive source 211, and the medium discharging transfer drive source 212 may have their dc motors.

There are control signals output from the controlling IC 80 to drive the belt drive source 230, the forward transfer drive source 231, and the reverse transfer drive source 232. The belt drive source 230 serves for driving drive rollers 322. The drive rollers 322 drive the transfer belt 321. The forward transfer drive source 231 serves to drive transfer rollers 341 and 342 for the upward transfer section 33, transfer rollers 351 for the horizontal transfer section 34, and the like. The reverse transfer drive source 232 serves to drive transfer rollers 362, 363, and 366 for the switchback transfer section 36. The belt drive source 230, the forward transfer drive source 231, and the reverse transfer drive source 232 may have their brush-less dc motors.

The head driver 610 of the printer 6 is connected to the controlling IC 80. The head driver 610 is operable with control signals supplied from the controlling IC 80 to control ink discharge amounts of the print head array 2 by regulating voltages applied to piezoelectric elements therein. The ink circulation system 62 is connected to the controlling IC 80. The controlling IC 80 is operable, for instance, to control ink circulation pumps for controlling circulation of inks in the ink circulation system 62. Further, the controlling IC 80 is operable to detect temperatures of circulating inks, and control ink temperatures by operating temperature controllers on the basis of detection results.

The head gap adjuster 611 of the printer 6 is operable to adjust a head gap between a nozzle header face of a print head 61 and a face of a recording medium 100, as necessary, on the basis of detection results at the medium thickness detector 26. In particular, as illustrated by FIG. 10A and FIG. 10B, envelopes 100E have profiles varied among an envelope body 101, a flap 102, and regions 1012 of laminated sheets. For a prescribed head gap to be secured, the head gap adjuster 611 is operated to control the head gap. In the image forming machine 1 according to the first embodiment, the head gap adjuster 611 employs a drive source of the print head array 61 to adjust the head gap. This is done by making the platen plate 63 relatively move in a vertical direction (to come close to or back away from the print head array 61).

To make a print on an envelope 100E, the flap 102 has a head gap to a print head 61 adjusted narrower than a head gap the envelope body 101 has to a print head 61. On the contrary, regions of laminated sheets 1012 have a head gap to a print head 61 adjusted wider than the head gap the envelope body 101 has to a print head 61. The envelope 100E has profiles different among areas of the envelope body 101, the flap 102, and the regions of laminated sheets 1012. For each area, the head gap is adjusted as necessary to have an equalized head gap over the area. The equalization of head gap allows for an equalized flying distance of ink discharged from associated ink discharge nozzles in the print head array 61. This permits an even print quality to be kept at each area.

The suction device 7 is connected to the controlling IC 80. The suction device 7 works under control of the controlling IC 80. The suction device 7 serves to suction a recording medium 100 or envelope 100E onto an upside of the transfer belt 321. This is done by suctioning air through suction holes provided through the platen plate 63 and air holes provided through the transfer belt 32. This arrangement can prevent interferences between a recording medium 100 or envelope 100E and print heads 61, allowing for ensured adequate head gaps in between.

[Envelope Printing Method by Image Forming Machine]

Figure 12:
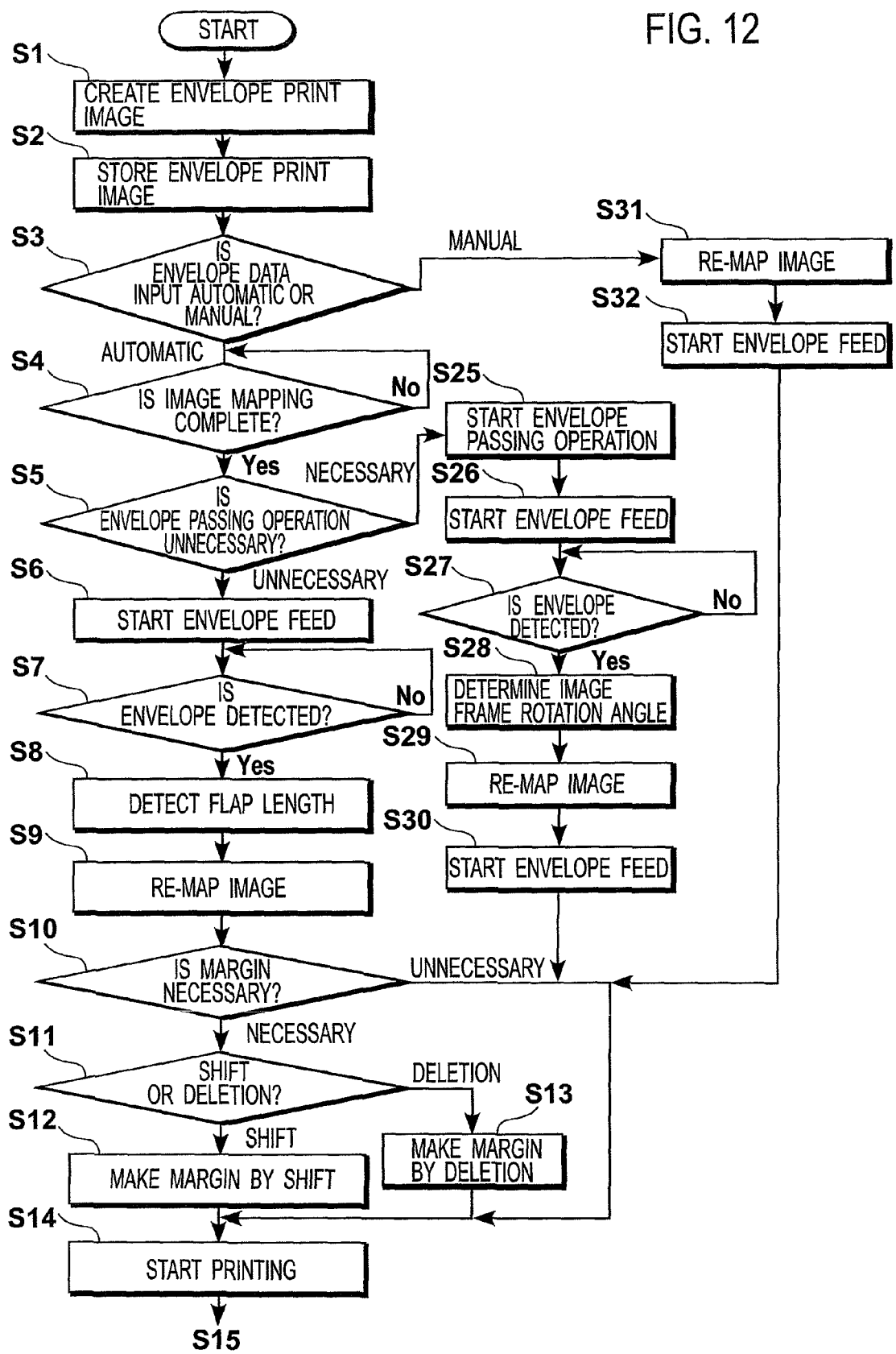
FIG. 12 is a flowchart describing part of a procedure for an envelope printing method using the image forming machine according to the first embodiment.
Figure 13:
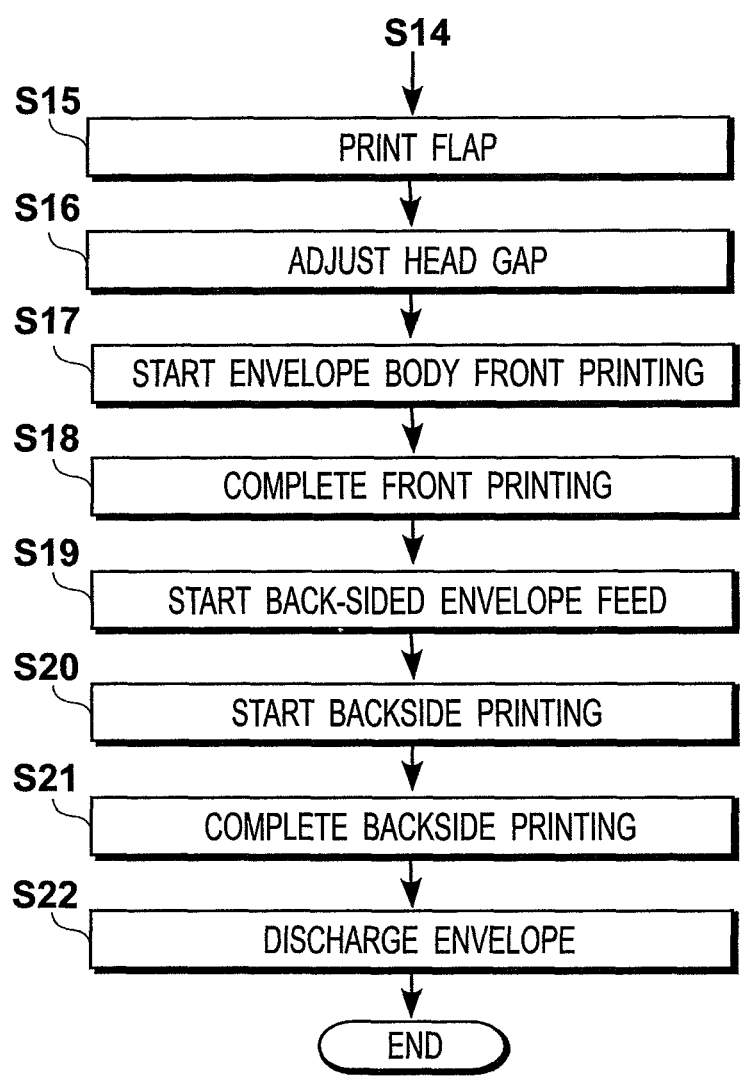
FIG. 13 is a flowchart describing the rest of the procedure for the envelope printing method shown in FIG. 12.

The image forming machine 1 according to the first embodiment is adapted to implement an envelope printing method as shown in FIG. 12 and FIG. 13, which will be described.

First, at a step S1, a combination of a front side image data 1013 and a backside image data 1014 is created by using, for instance, an external terminal (e.g. personal computer). The front side image data 1013 is created to print on the front side of an envelope 100E. The backside image data 1014 is created to print on the backside of the envelope 100E. Then, at a step S2, the image forming machine 1 has a combination of a first set of image data on the front side image data 1013 and a second set of image data on the backside image data 1014 stored in the image data memory 81 of the control section 8. More specifically, the first image data set and the second image data set are stored in envelope print image data storage areas 8102 (see FIG. 5).

Next, at a step S3, it is determined how to input envelope data for a printing on the envelope 100E. The envelope data may be data on attributes of the envelope 100E, including a shape and a profile. Here, it is determined whether the input system is an automatic input using various detectors in the image forming machine 1 or a manual input by a user's direct operation to the operational section 84.

If the input system is determined as being an automatic input, the control flow goes to a step S4. At the step S4, it is determined whether or not a mapping of image data sets stored in envelope print image data storage areas 8102 is completed. The mapping of image data sets includes dividing the second image data set of the backside image data 1014 to be printed on the backside of the envelope 100E, into a first subset thereof and a second subset thereof. The first subset of the second image data set covers first backside image data 1014A of the backside image data 1014 to be printed on a back of a body 101 of the envelope 100E. The second subset of the second image data set covers second backside image data 1014B of the backside image data 1014 to be printed on a face of a flap 102 of the envelope 100E. The mapping further includes generating a first print data subset from the first image data subset of the first backside image data 1014A. The mapping further includes generating a second print data subset from the second image data subset of the second backside image data 1014B. The envelope data mapper 812 stores therein the first print data subset as it is mapped thereon, and the second print data subset as it is mapped thereon. If the mapping of image data sets is not completed, the control flow again goes to the step S4, while promoting the mapping of image data sets.

If the mapping of image data sets is completed, the control flow goes to a step S5. At the step S5, it is determined whether or not a medium (passing operation for) transfer is unnecessary to detect a shape (size) of the envelope 100E. If the medium passing operation is determined as being unnecessary, the control flow goes to a step S6 to start feeding the envelope 100E. At the step S6, the envelope 100E is fed from e.g. the medium feed tray 21 in the medium feed system 2 to the medium feeding subsystem 31 of the medium transfer system 3 in the image forming machine 1. In the envelope printing method by the image forming machine 1 according to the first embodiment, the flap 102 is left as it is open relative to the envelope body 101. The envelope 100E is fed with the flap 102 in a leading position in the transfer direction, with the face of the envelope body 101 and the face of the flap 102 both set upside (as printable sides).

Then, at a step S7, it is determined by detection whether or not a recording medium 100 being fed in the medium feeding subsystem 31 is an envelope 100E. A shape of the envelope 100E is detected at the envelope shape detector 27, and stored in the envelope shape information acquirer 82 as shape information on the envelope 100E in accordance with a result of that detection. The envelope shape information stored in the envelope shape information acquirer 82 is read to the controlling IC 80, where it is collated by an envelope shape identifier 801 with envelope shape information stored in advance in an envelope shape data storage area 8101. The envelope shape identifier 801 is arranged in the controlling IC 80. If that information and this information have a match, the shape of envelope 100E is identified. If no envelope 100E is detected, the control flow again goes to the step S7.

If the recording medium 100 is identified as an envelope 100E, the control flow goes to a step S8. At the step S8, a length Lf of a flap 102 of the envelope 100E is detected. The length of the flap 102 is detected at the medium thickness detector 26, and stored in the envelope shape information acquirer 82 as shape information on the envelope 100E in accordance with a result of that detection. The envelope shape information stored in the envelope shape information acquirer 82 is read to the controlling IC 80, where it is collated by the envelope shape identifier 801 with envelope shape information stored in advance in the envelope shape data storage area 8101. If that information and this information have a match, the length Lf of the flap 102 is identified.

If the length Lf of the flap 102 is identified, the control flow goes to a step S9 to start a mapping (as a re-mapping) of the second image data set of the backside image data 1014 stored in the envelope print image data storage area 8102 on the basis (in consideration) of the length Lf. In the image forming machine 1 according to the first embodiment, the backside image data 1014 is divided into first backside image data 1014A to be printed on the back of the envelope body 101 and second backside image data 1014B to be printed on the face of the flap 102. In the re-mapping, the second backside image data 1014B is rotated at 180 degrees relative to the first backside image data 1014A. The re-mapping includes generating a first print data subset covering the first backside image data 1014A of the backside image data 1014, and generating a second print data subset covering the second backside image data 1014B of the backside image data 1014. The envelope data mapper 812 stores therein the first print data subset and the second print data subset.

Further, at a step S10, it is determined by selection whether or not a margin is necessary when generating the second print data subset in the image forming machine 1 according to the first embodiment. If the margin is necessary, the control flow goes to a step S11. At the step S11, it is determined by selection how to produce the margin. The selection can be made between a step S12 and a step S13. The step S12 includes translating the second backside image data 1014B of the backside image data 1014 to produce a margin 1014D. The step S13 includes eliminating a sub-region of the second backside image data 1014B of the backside image data 1014 to produce a margin 1014C. There is generated a second print data subset including data on the margin 1014C or 1014D, whichever is selected. This second print data subset is stored in the envelope data mapper 812.

Afterward, at a step S14, a printing to the envelope 100E is started. First, at a step S15, the second print data subset (covering the second backside image data 1014B of the backside image data 1014) is printed on the face of the flap 102 of the envelope 100E. This is followed by a step S16 of using the head gap adjuster 611 to adjust a head gap. Then, at a step S17, the front side image data 1013 is printed on the face of the body 101 of the envelope 100E. At a step S18, a one-side printing to the front side of the envelope 100E is completed.

Then, at a step S19, the envelope 100E is again transferred to the print assisting transfer section 32 through the switch-back transfer section 36. This is followed by a step S20 of starting a print on the back of the body 101 of the envelope 100E. This includes printing the first print data subset covering the first backside image data 1014A of the backside image data 1014 on the back of the envelope body 101. The first backside image data 1014A as printed is rotated at 180 degrees relative to the second backside image data 1014B printed on the face of the flap 102. As the flap 102 is folded back, the first backside image data 1014A as printed cooperates with the second backside image data 1014B as printed to constitute a backside image data 1014 recognizable as being single connected to be free of significant boundaries.

At a step S21, a printing to the backside of the envelope 100E is completed, whereby a two-side printing to the envelope 100E is now completed. Then, at a step S22, the envelope 100E is discharged on a medium stacker at the medium discharge system 4 or 5.

At the step S105, if the medium passing operation is determined as being necessary, the control flow goes to a step S25 to start passing the envelope 100E, and to a step S26 to start feeding the envelope 100E for envelope shape detection. In the medium passing operation, a single envelope 100E stacked in e.g. the medium feed tray 21 in the medium feed system 2 is fed to the medium feeding subsystem 31 of the medium transfer system 3. The medium passing operation is similar to a normal printing operation making no prints. The envelope 100E is transferred through the print assisting transfer section 32 to the medium discharging transfer section 38, to discharge on a medium stacker at the medium discharge system 4. Or else, the envelope 100E is transferred to the medium discharging transfer section 35, to discharge on a medium stacker at the medium discharge system 5. During the medium passing operation, the envelope shape detector 27 in the medium feeding subsystem 31 is operated to detect a shape of the envelope 100E. Further, the medium thickness detector 26 is operated to detect shapes of at least a body 101 and a flap 102 of the envelope 100E. Results of such detections are collected, and stored as shape information on envelope in the envelope shape information acquirer 82.

Then, at a step S27, it is determined by detection whether or not a recording medium 100 being fed in the medium feeding subsystem 31 is an envelope 100E. Like the step S7, a shape of the envelope 100E is detected at the envelope shape detector 27, and stored in the envelope shape information acquirer 82 as shape information on the envelope 100E in accordance with a result of that detection. The envelope shape information stored in the envelope shape information acquirer 82 is read to the controlling IC 80, where it is collated by the envelope shape identifier 801 with envelope shape information stored in advance in an envelope shape data storage area 8101. If that information and this information have a match, the shape of envelope 100E is identified. If no envelope 100E is detected, the control flow again goes to the step S27.

In the medium passing operation, if an envelope 100E is detected, shape information on the envelope is stored in the envelope shape information acquirer 82, and read therefrom to the controlling IC 80. At the controlling IC 80, the read shape information is collated with image data sets stored in an envelope shape data storage area 8101. Then, at a step S28, a determination is made of the angle of image rotation that a second backside image data 1014B of a backside image data 1014 has to a first backside image data 1014A of the backside image data 1014. The first backside image data 1014A is to be printed on a back of a body 101 of the envelope. The second backside image data 1014B is to be printed on a face of a flap 102 of the envelope. Here, for instance, the second backside image data 1014B is determined to be rotated at 180 degrees relative to the first backside image data 1014A.

In the medium passing operation, the medium thickness detector 26 is operated to detect a length Lf of a flap 102 of an envelope 100E. Hence, at a step S29, a mapping (as a re-mapping) of data of the backside image data 1014 stored in the envelope print image data storage area 8102 is started on the basis (in consideration) of the length Lf of the flap 102, like the steps S9 to S12 or S13. At the step S29, also a margin is concurrently produced like the steps S10 to S12 or S13, and a second print data subset inclusive of data on the margin (to be 1014C or 1014D) is generated. The second print data subset is stored in the envelope data mapper 812. The medium passing operation comes to an end through the sequence of steps S25 to S29, and is followed by a step S30 to feed an envelope 100E, and by the step S14 to start a printing to the envelope 100E.

Further, at the step S3, if the input system is determined (or selected) to be a manual input, the control flow goes to a step S31. At the step S31, a mapping (as a re-mapping) of data of the backside image data 1014 stored in the envelope print image data storage area 8102 is started on the basis (in consideration) of a piece of information on a length Lf of a flap 102. The piece of information may be a data on a length Lf of a flap 102 of an envelope 100E stored in an envelope shape data storage area 8101, or a data on a length Lf of a flap 102 directly input by a user at the operational section 84. At the step S31, also a margin is concurrently produced like the steps S10 to S12 or S13, and a second print data subset inclusive of data on the margin (to be 1014C or 1014D) is generated. The second print data subset is stored in the envelope data mapper 812. The step S31 is followed by a step S32 to feed an envelope 100E, and by the step S14 to start a printing to the envelope 100E.

[Features of the First Embodiment]

In the image forming machine 1 according to the first embodiment, image data of a backside image data 1014 is stored in an envelope print image data storage area 8102 of a image data memory 81. The image data is divided into a first print data and a second print data at an envelope data mapper 812. Then, a printer 6 is adapted to print on a back of an envelope body 101 a first backside image data 1014A of the backside image data based on the first print data. The printer 6 is adapted to print on a face of a flap 102 a second backside image data 1014B of the backside image data based on the second print data. Those prints can be made on an envelope 100E in a stretched state with an open flap 102, and constitute a single backside image data 1014 when the flap 102 is folded back to close after print. This arrangement can prevent interferences that might occur between a flap 102 and print heads 61 when printing a backside image data 1014 lying astride an envelope body 101 and the flap 102. It can prevent failures in transfer of envelope 100E, damages to envelope 100E, and degradation of print quality.

Further, in the image forming machine 1 according to the first embodiment, the envelope data mapper 812 can serve to execute a process of rotating a second backside image data 1014B of a backside image data. Accordingly, the second backside image data can be small in amount of information, permitting second print data to be generated at an enhanced rate. Further, reduced amounts of image data allow an envelope data mapper 812 to have a minimized storage capacity.

Further, in the image forming machine 1 according to the first embodiment, the envelope data mapper 812 can serve to eliminate a sub-region of a second backside image data 1014B of a backside image data along a peripheral region on a face of a flap 102, to provide a margin 1014C. The provision of a margin 1014C allows for a reduced amount of backside images to be printed on the peripheral region on the face of the flap 102. In application of the image forming machine 1 to an inlet printer, an envelope 100E has a flap 102 thereof in a leading position in a transfer direction, in a trailing position in the transfer direction, or at a lateral position with respect to the transfer direction. Air might be entrained by the transfer, causing droplets of ink propelled out of print heads 61 to have tracks deviated with increased tendencies. Or, ink mist might be produced with increased tendencies along peripheral regions on a face of a flap 102. Such a peripheral region is kept from being printed. This arrangement can prevent a flap 102 from being stained by ink droplets or ink mist, allowing for an enhanced print quality.

Further, in the image forming machine 1 according to the first embodiment, the envelope data mapper 812 can serve to translate second backside image data 1014B of backside image data toward a peripheral region on a face of a flap 102, to provide a margin 1014D. The provision of a margin 1014D allows for a reduced amount of backside images to be printed on the peripheral region on the face of the flap 102. Such a peripheral region on a face of a flap 102 is kept from being printed. This arrangement can prevent a flap 102 from being stained by ink droplets or ink mist, allowing for an enhanced print quality.

Further, in the image forming machine 1 according to the first embodiment, an envelope shape identifier 801 is used for detection of shapes of a body 101 and a flap 102 of an envelope 100E. The envelope shape identifier 801 is further used for collation of shape information stored in envelope shape data storage areas 8101, permitting shape information of the body 101 and the flap 102 of the envelope 100E to be identified. This arrangement permits data on backside image data 1014 to be separated into a first print data subset to be printed on the envelope body 101, and a second print data subset to be printed on the flap 102.

Further, in the image forming machine 1 according to the first embodiment, an envelope shape information acquirer 82 is used for detection of shapes of a body 101 and a flap 102 of a passing envelope 100E. Detection results are based on to acquire shape information of the envelope body 101 and the flap 102. Further, the envelope shape identifier 801 is used to identify shape information of the envelope body 101 and the flap 102 on the basis of acquired shape information. This arrangement permits print data of backside image data 1014 to be divided into a first print data subset to be printed on the envelope body 101, and a second print data subset to be printed on the flap 102.

Further, in the image forming machine 1 according to the first embodiment, a head gap adjuster 611 is used for equalization of head gaps between a body 101 of an envelope 100E and print heads 61 and head gaps between a flap 102 of the envelope 100E and print heads 61. This arrangement permits flying distances of ink droplets to be equalized for both prints, allowing for an enhanced print quality. Further, the arrangement permits arrival times of ink droplets from ink discharge nozzles to the envelope body 101 and arrival times of ink droplets propelled from ink discharge nozzles to the flap 102 to be equalized. Therefore, first backside image data 1014A of a backside image data to be printed on the envelope body 101 and second backside image data 1014B of the backside image data to be printed on the flap 102 can be equalized in print quality. Image transition along boundaries in between (i.e. boundary regions recognizable with changed image qualities) can be made inconspicuous. This affords to have a print quality in no way inferior as single backside image data 1014.

First Modification

Figure 14:
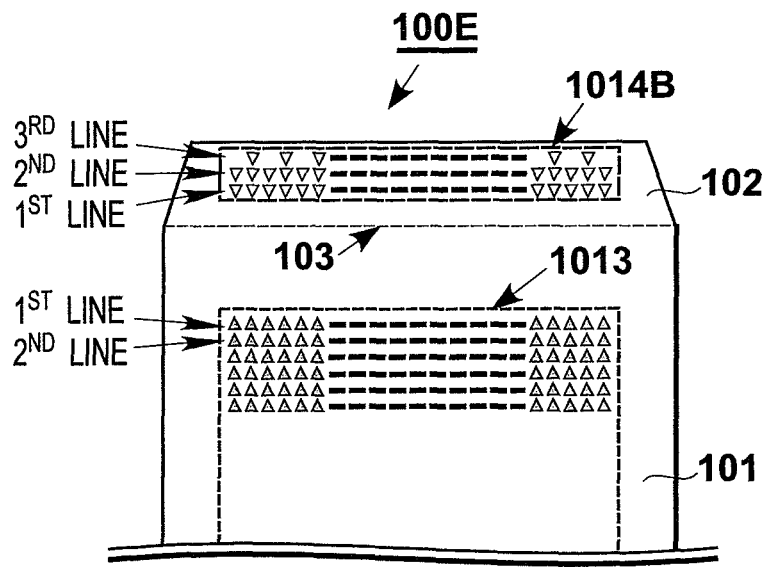
FIG. 14 is an enlarged front side view of an envelope describing a method of thinning images using an image forming machine according to a first modification of the first embodiment.

Description is now made of an image forming machine 1 according to a first modification of the first embodiment, with reference to FIG. 14. This is an example in which a margin is produced in second backside image data 1014B to be printed on a face of a flap 102 of an envelope 100E in a different manner.

In the image forming machine 1 according to the first modification, an envelope data mapper 812 serves to generate a second print data subset. This print data subset is arranged to make a thinning of a part of a set of pixels of a second backside image data 1014B of backside image data at a peripheral region on a face of a flap 102. The second print data subset is stored in the envelope data mapper 812. Here, the thinning is made of a part of a set of pixels of the second backside image data 1014B of the backside image data. This is made in a line area of a third line of pixels that constitutes a leading line in the transfer direction when printing the second backside image data 1014B on the face of the flap 102. No ink is discharged to those regions corresponding to thinned pixels. The thinning may be made by eliminating one or more pixels at intervals of one or more pixels in e.g. the third line of pixels. The thinning does not provide any complete margin, but reduces the number of pixels. It can decrease ink droplets that may have disordered tracks. Further, it can reduce occurrences of ink mist.

In the flowchart shown in FIG. 12, the sequence of steps S10 to S12 or S13 may be replaced by a thinning step permitting a facilitated printing to an envelope 100E.

Such being the case, in the image forming machine 1 according to the first modification, a thinning is made of a part of a set of pixels in a peripheral region on a face of a flap 102. The thinning allows for a reduced amount of backside images to be printed on the peripheral region on the face of the flap 102. In application of the image forming machine 1 to an inkjet printer, an envelope 100E has a flap 102 thereof in a leading position in a transfer direction, in a trailing position in the transfer direction, or at a lateral position with respect to the transfer direction. Air might be entrained by the transfer, causing droplets of ink propelled out of print heads 61 to have tracks deviated with increased tendencies, or ink mist might be produced with increased tendencies along peripheral regions on a face of a flap 102. Such a peripheral region has a reduced amount of ink propelled thereon. This arrangement can prevent a flap 102 from being stained by ink droplets or ink mist, allowing for an enhanced print quality.

Second Modification

Figure 15:
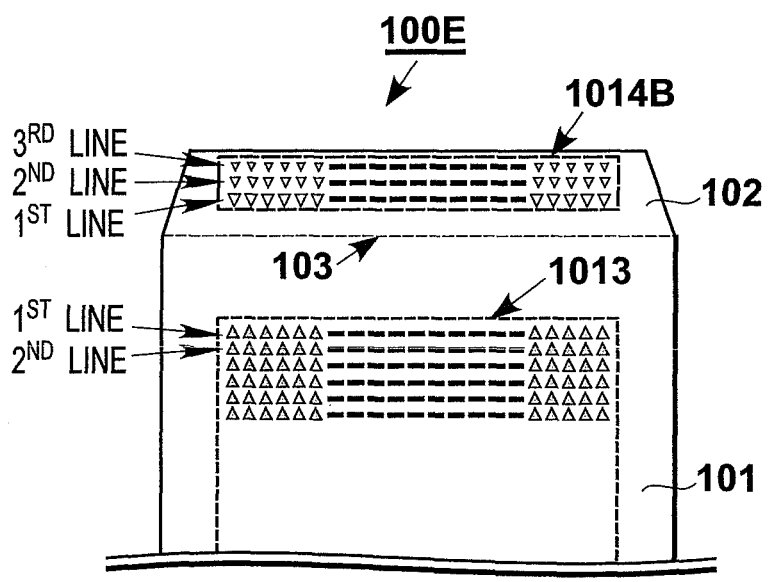
FIG. 15 is an enlarged front side view of an envelope describing a method of thinning images using an image forming machine according to a second modification of the first embodiment.

Description is now made of an image forming machine 1 according to a second modification of the first embodiment, with reference to FIG. 15. This is an example in which a margin is produced in second backside image data 1014B to be printed on a face of a flap 102 of an envelope 100E in a different manner.

In the image forming machine 1 according to the second modification, an envelope data mapper 812 serves to generate a second print data subset. This print data subset is arranged to make a thinning in numbers of droplets of ink propelled from an array of ink discharge nozzles to a part of a set of pixels of second backside image data 1014B of backside image data at a peripheral region on a face of a flap 102. The second print data subset is stored in the envelope image data mapper 812. Here, the thinning is made in numbers of droplets of ink propelled to a part of a set of pixels of the second backside image data 1014B of the backside image data. This is made in a line area of a third line of pixels that constitutes a leading line in the transfer direction when printing the second backside image data 1014B on the face of the flap 102. At each pixel subjected to a thinning, the ink droplet number is smaller than those of pixels free from thinning. The thinning in drop number may be effectively made by stepwise changing ink droplet numbers, for instance, by decreasing two droplets at the third line, three droplets at the second line, and fur droplets at the first line. The thinning in drop number does not provide any complete margin, but reduces the number of droplets. It can decrease ink droplets that may have disordered tracks. Further; it can reduce occurrences of ink mist.

In the flowchart shown in FIG. 12, the sequence of steps S10 to S12 or S13 may be replaced by a step of making a thinning in droplet number, permitting a facilitated printing to an envelope 100E.

Such being the case, in the image forming machine 1 according to the second modification, the envelope data mapper 812 serves to generate a second print data subset. This print data subset is arranged to make a thinning (reduction) in numbers of ink droplets propelled from ink discharge nozzles of print heads 61 to a part of a set of pixels of second backside image data 1014B of backside image data at a peripheral region on a face of a flap 102. This thinning can reduce real factors causing ink droplets to have tracks deviated with increased tendencies, and real factors causing ink mist. An envelope 100E has a flap 102 thereof in a leading position in a transfer direction, in a trailing position in the transfer direction, or at a lateral position with respect to the transfer direction. Air might be entrained by the transfer, causing droplets of ink propelled out of print heads 61 to have tracks deviated with increased tendencies, or ink mist might be produced with increased tendencies. The very factors of occurrences can be reduced. This arrangement can prevent a flap 102 from being stained by ink droplets or ink mist, allowing for an enhanced print quality.

Second Embodiment

Description is now made of an image forming machine 1 according to a second embodiment of the present invention. This is an example in which the image forming machine 1 according to the first embodiment is modified to have a printer 6 adapted to discharge ink from print heads 61 at ink discharge timings varied in accordance with regions of an envelope 100E.

Figure 16:
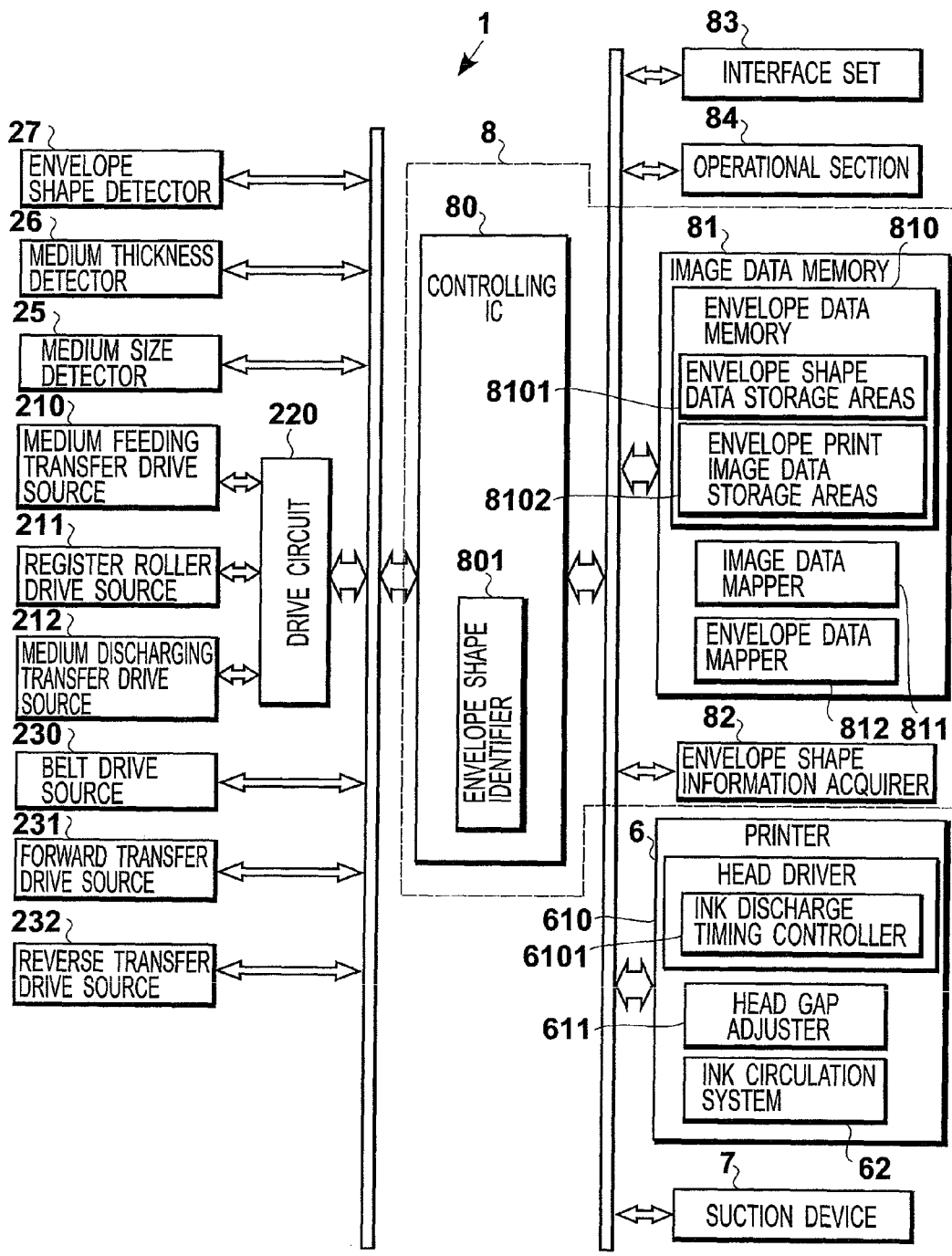
FIG. 16 is a system configuration diagram of an image forming machine according to a second embodiment of the present invention.

The image forming machine 1 according to the second embodiment is basically similar to the image forming machine 1 according to the first embodiment. The former is different from the latter in that as shown in FIG. 16 a printer 6 has a head driver 610 connected to an ink discharge timing controller 6101. The ink discharge timing controller 6101 controls timings for ink discharge nozzles of a print head 61 to discharge ink to a flap 102, to advance ahead of timings for ink discharge nozzles to discharge ink to a body 101 of an envelope 100E. In other words, the ink discharge timing controller 6101 has a function of controlling ink discharge timings to delay when head gaps are small, and to advance when head gaps are large.

Figures 17A, 17B:
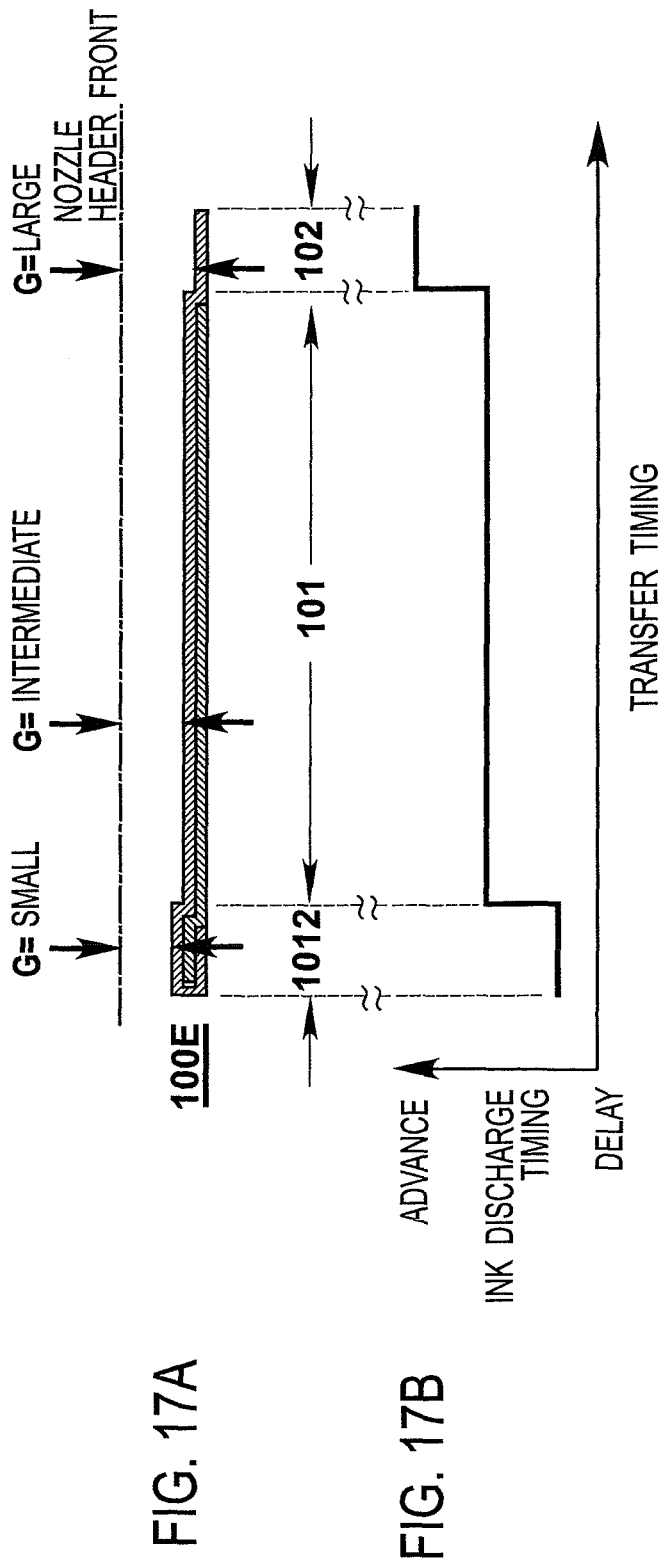
FIG. 17A is a sectional view of an envelope used in the image forming machine according to the second embodiment.
FIG. 17B is a timing chart showing ink discharge timings to be established at an ink discharge timing controller of the image forming machine.

FIG. 17A shows a schematic section of an envelope 100E. FIG. 17B shows ink discharge timings controlled by the ink discharge timing controller 6101. The ink discharge timing controller 6101 controls ink discharge timings to advance for a printing to a flap 102, relative to a printing to an envelope body 101. The ink discharge timing controller 6101 controls ink discharge timings to delay for a printing to a region of laminated sheets 1012, relative to the printing to the envelope body 101.

Such being the case, in the image forming machine 1 according to the second embodiment, the ink discharge timing controller 6101 is used to control timings for ink discharge nozzles to discharge ink to a flap 102, to advance. This arrangement permits first backside image data 1014A of backside image data printed on an envelope body 101 to have a print quality equalized to second backside image data 1014B of the backside image printed on the flap 102. Image transition along boundaries in between can be made inconspicuous. This affords to have a print quality in no way inferior as single backside image data 1014. Such effects are available in addition to the effects obtainable from the image forming machine 1 according to the first embodiment.

It is noted that the image forming machine 1 according to the second embodiment can work without head gap control in other examples.

Other Embodiments

Although the present invention has been described by using the first and the second embodiment, this invention should not be restricted by any phrases or drawings constituting part of the disclosure. The present invention is applicable to various substitute embodiments, embodiment examples, and application techniques. For instance, the present invention is not limited to applications simply having a printer function. The present invention is applicable also to composite types of inkjet printers having a scanner function or a facsimile function.

As will be seen from the foregoing description, the present invention is widely applicable to image forming apparatuses adapted to print single image data on a combination of a back of a body of an envelope and a face of a flap of the envelope. This arrangement prevents interferences between the flap of the envelope and a print head array. This arrangement allows for a printing free from failures in transfer of envelope, deformation of envelope, or degradation of print quality.

The present application claims the benefit of priority under 35 U.S.C. §119 to Japanese Patent Application No. 2011-051857, filed on Mar. 9, 2011, the entire content of which is incorporated herein by reference.

What is claimed is:
1. An image forming apparatus comprising:
   an image data memory configured to store image data to be printed on a back of a body of an envelope and image data to be printed on a face of a flap of the envelope, as backside image data of the envelope in a closed state having the flap folded on the back of the body;
   an image data mapper configured to generate print data of first backside image data to be printed on the back of the envelope body and print data of second backside image data to be printed on the face of the flap, based on the backside image data stored in the image data memory; and
   a printer configured to perform double sided printing, wherein first backside image data is printed on the back of the envelope body, based on the print data of the first backside image data generated at the image data mapper, and a second backside image data is printed on the face of the flap, based on the print data of the second backside image data generated at the image data mapper, wherein the flap of the envelop is an open state during printing and a single image is reconstructed as a combination of the image printed on the back of the envelop body and the image printed on the face of the flap, and a suction device configured to draw air and suction the envelop fed to the printer, a medium transfer system configured to transfer the envelop being suctioned by the suction device, wherein the printer configured to make a print on the envelop being transferred by the medium transfer system, wherein the image data mapper is configured to eliminate image data in a region at an edge of the flap in the second backside image data, the region is in a leading position in a transfer direction to generate print data provided with a margin in the eliminated region, as the print data of the second backside image data.

2. The image forming apparatus according to claim 1, wherein the image data mapper is configured to translate the second backside image data from an end thereof at an edge of the flap toward the body of the envelope, to generate print data provided with a margin in a region at the edge of the flap, the region is in a leading position in a transfer direction, as the print data of the second backside image data.

3. The image forming apparatus according to claim 1, wherein the printer is provided with an inlet print head array, and configured for using ink discharged from nozzles of the print head array to print the first and the second backside image data, the image forming apparatus further comprising a head gap adjuster configured to adjust a head gap between the flap and the print head array to be narrower than a head gap between the body of the envelope and the print head array at the printer.

4. An image forming apparatus comprising:

an image data memory configured to store image data to be printed on a back of a body of an envelope and image data to be printed on a face of a flap of the envelope, as backside image data of the envelope in a closed state having the flap folded on the back of the body;

an image data mapper configured to generate print data of first backside image data to be printed on the back of the envelope body and print data of second backside image data to be printed on the face of the flap, based on the backside image data stored in the image data memory; and a printer configured to perform double sided printing, wherein first backside image data is printed on the back of the envelope body, based on the print data of the first backside image data generated at the image data mapper, and a second backside image data is printed on the face of the flap, based on the print data of the second backside image data generated at the image data mapper, wherein the flap of the envelop is an open state during printing and a single image is reconstructed as a combination of the image printed on the back of the envelop body and the image printed on the face of the flap, and a suction device configured to draw air and suction the envelop fed to the printer, a medium transfer system configured to transfer the envelop being suctioned by the suction device, wherein the printer configured to make a print on the envelop being transferred by the medium transfer system, wherein the image data mapper is configured to generate the print data of the second backside image data, as print data having thinned images in a region at an edge of the flap in the second backside image data.

5. The image forming apparatus according to claim 4, wherein the printer is provided with an inkjet print head array, and configured for using ink discharged from nozzles of the print head array to print the first and the second backside image data, and the image data mapper is configured to generate the print data of the second backside image data, as print data having thinned numbers of droplets of ink to be discharged from nozzles used for formation of images in a region at an edge of the flap in the second backside image data.

6. An image forming apparatus comprising:

an image data memory configured to store image data to be printed on a back of a body of an envelope and image data to be printed on a face of a flap of the envelope, as backside image data of the envelope in a closed state having the flap folded on the back of the body;

an image data mapper configured to generate print data of first backside image data to be printed on the back of the envelope body and print data of second backside image data to be printed on the face of the flap, based on the backside image data stored in the image data memory; and a printer configured to perform double sided printing, wherein first backside image data is printed on the back of the envelope body, based on the print data of the first backside image data generated at the image data mapper, and a second backside image data is printed on the face of the flap, based on the print data of the second backside image data generated at the image data mapper, wherein the flap of the envelop is an open state during printing and a single image is reconstructed as a combination of the image printed on the back of the envelop body and the image printed on the face of the flap, and an envelope shape data storage area configured to store shape information of the body and the flap of the envelope; and an envelope shape identifier configured to collate detected shapes of the body and the flap of the envelope with shape information stored in the envelope shape data storage area, to identify a piece of shape information relative to the detected shapes, wherein the image data mapper is configured to generate the print data of the second backside image data in accordance with a shape of the flap corresponding to the piece of shape information identified at the envelope shape identifier.

7. The image forming apparatus according to claim 6, further comprising:

a medium feed system operable to feed the envelope;

a medium discharge system operable to discharge the envelope;

a transfer system operable to transfer the envelope fed from the medium feed system to the medium discharge system via the printer; and an envelope shape information acquirer configured to acquire a piece of shape information on the body and the flap of the envelope, based on a result of a detection to the body and the flap, as the detection is made by passing the envelope by using the transfer system.

8. An image forming apparatus comprising:

an image data memory configured to store image data to be printed on a back of a body of an envelope and image data to be printed on a face of a flap of the envelope, as backside image data of the envelope in a closed state having the flap folded on the back of the body;

an image data mapper configured to generate print data of first backside image data to be printed on the back of the envelope body and print data of second backside image data to be printed on the face of the flap, based on the backside image data stored in the image data memory; and a printer configured to perform double sided printing, wherein first backside image data is printed on the back of the envelope body, based on the print data of the first backside image data generated at the image data mapper, and a second backside image data is printed on the face of the flap, based on the print data of the second backside image data generated at the image data mapper, wherein the flap of the envelop is an open state during printing and a single image is reconstructed as a combination of the image printed on the back of the envelop body and the image printed on the face of the flap, and wherein: the printer is provided with an inkjet print head array, and configured for using ink discharged from nozzles of the print head array to print the first and the second backside image data, the image forming apparatus further comprising an ink discharge timing controller configured to control a timing to discharge ink from nozzles of the print head array to the flap, to advance relative to a timing to discharge ink from nozzles of the print head array to the body of the envelope.

* * * * *